United States Patent
Kitagawa et al.

(10) Patent No.: US 8,989,957 B2
(45) Date of Patent: *Mar. 24, 2015

(54) VEHICLE BEHAVIOR DATA STORAGE CONTROL SYSTEM, ELECTRONIC CONTROL UNIT AND DATA STORAGE DEVICE

(75) Inventors: Tomohiro Kitagawa, Kariya (JP); Masayoshi Kondoh, Chriyu (JP)

(73) Assignee: Denso Corporation, Kariya (JP)

( * ) Notice: Subject to any disclaimer, the term of this patent is extended or adjusted under 35 U.S.C. 154(b) by 479 days.

This patent is subject to a terminal disclaimer.

(21) Appl. No.: 13/338,590

(22) Filed: Dec. 28, 2011

(65) Prior Publication Data
US 2012/0166039 A1 Jun. 28, 2012

(30) Foreign Application Priority Data
Dec. 28, 2010 (JP) .................................. 2010-292718

(51) Int. Cl.
| | |
|---|---|
| G01M 17/00 | (2006.01) |
| G06F 7/00 | (2006.01) |
| G06F 19/00 | (2011.01) |
| G07C 5/08 | (2006.01) |
| B60W 40/09 | (2012.01) |

(52) U.S. Cl.
CPC ............... *G07C 5/085* (2013.01); *B60W 40/09* (2013.01)
USPC ........ 701/32.7; 701/29.1; 701/29.2; 701/32.3

(58) Field of Classification Search
CPC . B60W 50/04; B60W 50/045; B60W 50/029; B60R 16/02; B60R 16/023; B60R 16/0232; G01M 15/05; G01M 15/042; G06F 17/40
USPC .............................. 701/29.1, 29.2, 32.3, 32.7

IPC ....... B60W 50/04,50/045, 50/029; B60R 16/02, B60R 16/023, 16/0232; G01M 15/05, 15/042; G06F 17/40
See application file for complete search history.

(56) References Cited

U.S. PATENT DOCUMENTS

| | | | |
|---|---|---|---|
| 5,754,965 A | 5/1998 | Hagenbuch | |
| 7,079,927 B1 * | 7/2006 | Tano et al. | ................... 701/29.6 |
| 7,512,469 B2 * | 3/2009 | Tohdo et al. | ..................... 701/48 |
| 2007/0257781 A1 * | 11/2007 | Denson | ...................... 340/425.5 |
| 2009/0037044 A1 * | 2/2009 | Enomoto et al. | ................ 701/33 |
| 2010/0045452 A1 * | 2/2010 | Periwal | ......................... 340/439 |

(Continued)

FOREIGN PATENT DOCUMENTS

| | | |
|---|---|---|
| JP | 2008-3657 | 1/2008 |
| JP | 2009-87274 | 4/2009 |

(Continued)

*Primary Examiner* — Jason Holloway
*Assistant Examiner* — Rachid Bendidi
(74) *Attorney, Agent, or Firm* — Nixon & Vanderhye P.C.

(57) ABSTRACT

A vehicle behavior data storage control system is disclosed. The system includes a storage control device and an electronic control unit (ECU). The storage control device determines whether or not an unexpected behavior has occurred based on a behavior data. When the ECU determines that a change in the behavior data is attributed to control performed by the ECU, the ECU transmits a determination result to an in-vehicle network. At a time when the storage control device determines that the unexpected behavior has occurred, the storage control device records the behavior data at this time in the memory. When determining that the unexpected behavior relates to the control performed by the ECU, the storage control device deletes or permits overwriting the behavior data stored in the memory.

14 Claims, 12 Drawing Sheets

(56) References Cited

U.S. PATENT DOCUMENTS

2010/0061700 A1\*  3/2010  Morimoto et al. .............. 386/95
2011/0190978 A1\*  8/2011  Mao et al. ...................... 701/35
2012/0253586 A1\* 10/2012  Sakakibara ................. 701/29.2

FOREIGN PATENT DOCUMENTS

| | | |
|---|---|---|
| JP | 2009-205368 | 9/2009 |
| JP | 2010-3086 | 1/2010 |
| JP | 2010-224798 | 10/2010 |

\* cited by examiner

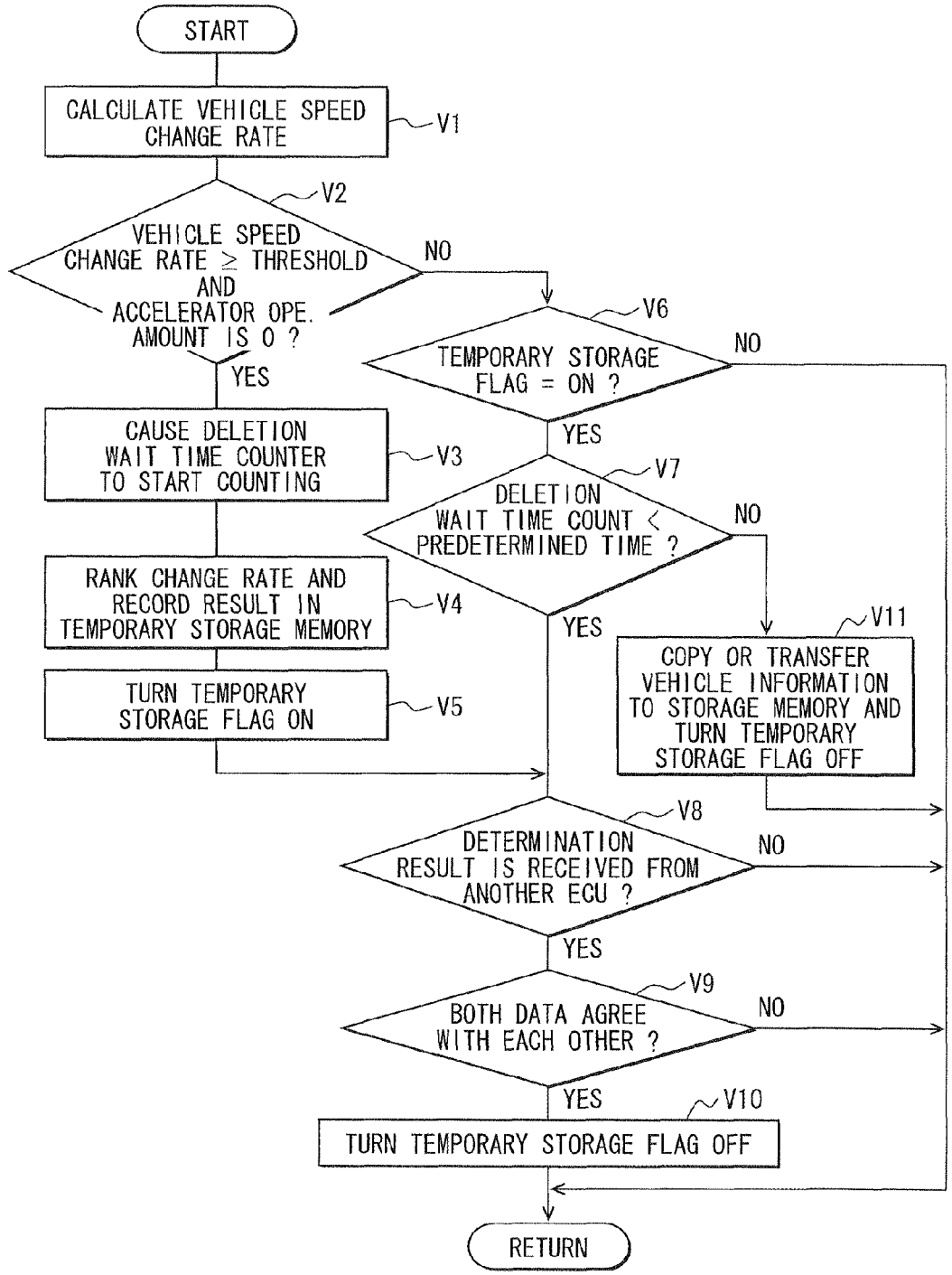

VEHICLE BEHAVIOR DATA STORAGE CONTROL SYSTEM, ELECTRONIC CONTROL UNIT AND DATA STORAGE DEVICE

CROSS REFERENCE TO RELATED APPLICATION

The present application is based on and claims priority to Japanese Patent Application No. 2010-292718 filed on Dec. 28, 2010, disclosure of which is incorporated herein by reference.

TECHNICAL FIELD

The present disclosure relates to a vehicle behavior data storage control system, an electronic control unit, and a data storage device which can efficiently record a necessary behavior data.

BACKGROUND

There is a storage control device which records a behavior data in a memory when an abnormal vehicle behavior is detected. The behavior data indicates a vehicle behavior at that time and may include vehicle information and control information. The behavior data is used in subsequent analysis (see JP-A-2009-205368, for example).

In this relation, the inventors of the present application have found the following. A system may be configured such that, when a behavior data satisfies a predetermined condition, the storage control device alone determines an abnormal behavior. In this configuration, even when the behavior data causing the determination of the abnormal behavior is attributed to normal control that is performed by another ECU based on a driver's order, the behavior data indicating the abnormal behavior is recorded in the memory. For example, a condition for the storage control device to determine an abnormal behavior may be set to an acceleration that is greater than or equal to a predetermined threshold. In this case, when the driver presses down an accelerator pedal in order to pass another vehicle, the storage control device may determine that an abnormal behavior has occurred, so even though a throttle control ECU other than the storage control device has controlled a throttle to generate a driver expected acceleration. When this kind data of a driver expected normal behavior is recorded, the data of a driver expected behavior (also called herein a normal behavior) may mixed with the data of a driver unexpected behavior (also called herein an abnormal behavior). It should be noted that a data of an abnormal behavior is a data to be recorded. Therefore, there is a possibility that it becomes impossible to adequately analyze a cause of an unexpected behavior in a later analysis.

SUMMARY

In view of the foregoing, it is an objective of the present disclosure to improve accuracy of determining whether or not an unexpected behavior has occurred, so that a behavior data can be stored in a way that facilitates later analysis.

According to a first example of the present disclosure, a vehicle behavior data storage control system comprises a storage control device and an electronic control unit (ECU). The storage control device includes: a behavior determination section that acquires behavior data and makes a first determination of whether or not an unexpected behavior has occurred based on the acquired behavior data; and a memory for storing therein the behavior data associated with the unexpected behavior. The electronic control unit (ECU) controls a predetermined control target and is connected to the storage control device via an in-vehicle network to enable data exchange with the storage control device. The ECU includes a determination result providing section. In response to a change in the behavior data of the ECU, the determination result providing section makes a second determination of whether or not the change in the behavior data of the ECU is attributed to control performed by the ECU. In response to determining that the change in the behavior data is attributed to the control performed by the ECU, the determination result providing section transmits a result of the second determination to the in-vehicle network. The storage control device further includes a storage control section and a correction section. At a time when the behavior determination section makes the first determination that the unexpected behavior has occurred, the storage control section records the behavior data at the time of making the first determination in the memory. The correction section makes a third determination of whether or not content of the unexpected behavior relates to the result of the second determination transmitted from the ECU to the in-vehicle network. When making the third determination that the content of the unexpected behavior relates to the result of the second determination, the correction section deletes or permits overwriting the behavior data stored in the memory.

According to a second example of the present disclosure, a subject electronic control unit is provided. The subject electronic control unit (i) acquires an actual behavior data indicating an actual vehicle behavior, (ii) determines based on the acquired actual behavior data whether or not an unexpected behavior has occurred, and (iii) is connected to a network when it is determined that unexpected behavior has occurred. A storage device for storing the actual behavior data is connected to the network. The subject electronic control unit comprises a controller that performs an estimation operation to provide an estimated behavior data based on an amount of control performed by the subject electronic control unit. When a difference between the estimated behavior data and the actual behavior data is less than or equal to a predetermined value, the controller outputs first information to the network. The first information indicates that the actual behavior data is attributed to the control performed by the subject electronic control unit.

According to a third example of the present disclosure, a data storage device is provided. The data storage device is connected to a network for a vehicle. The network is connected with an electronic control unit. The electronic control unit outputs a control command for controlling an actuator. When an actual behavior data representing an actual vehicle behavior is attributed to the control command of the electronic control unit, the electronic control unit outputs a correction command. The data storage device comprises a memory and a controller. When determining, based on the actual behavior data, that an unexpected behavior has occurred, the controller records the actual behavior data in the memory. When receiving the correction command, the controller deletes the actual behavior data stored in the memory or changes the actual behavior data stored in the memory into an overwritable state.

According the above vehicle behavior data storage control system, the subject electronic control unit, and the data storage device, it is possible to improve accuracy of determining whether or not an unexpected behavior has occurred, so that a behavior data can be stored in a way that facilitates later analysis.

The above vehicle behavior data storage control system, the subject electronic control unit, and the data storage device are made in consideration of, for example, the followings. When a storage control device determines occurrence of an unexpected behavior and records a behavior data in a memory, the storage control device acquires a determination result from another ECU via an in-vehicle network. In some cases, the determination result may indicate that a behavior change has occurred as a result of control processing that the another ECU has performed based on instructions from a driver. In this case, it can be determined that the corresponding behavior data stored in the memory of the storage control device is a consequence of that normal control performed based on the driver's instructions. Thus, by deleting the stored behavior data, the memory can store the behavior data corresponding to only a truly-unexpected behavior.

BRIEF DESCRIPTION OF THE DRAWINGS

The above and other objects, features and advantages of the present disclosure will become more apparent from the following detailed description made with reference to the accompanying drawings. In the drawings:

FIG. 12 is a flowchart of data processing according to the fifth embodiment.

DETAILED DESCRIPTION

Figure 1:
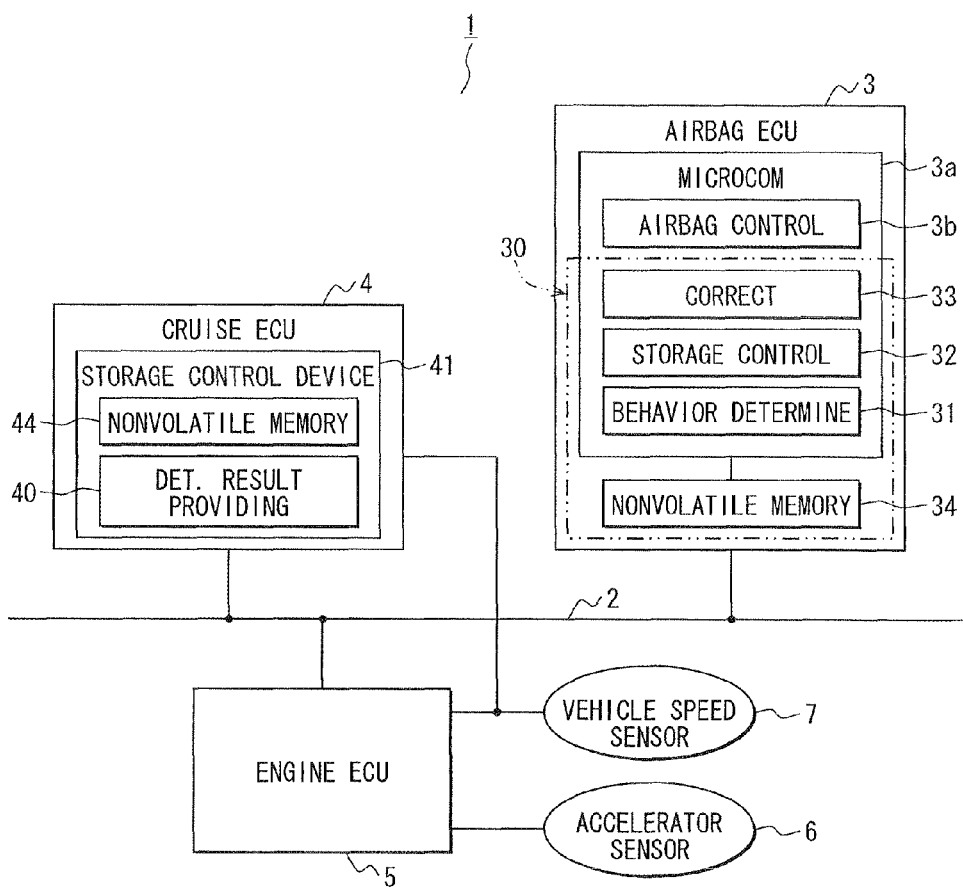
FIG. 1 is a functional block diagram of a vehicle behavior data storage control system according to a first embodiment.

Embodiments will be described below.
<First Embodiment>
A first embodiment will be described below with reference to FIGS. 1 to 4. In the first embodiment, a vehicle behavior data storage control system 1 is connected with electronic control units (ECUs) such as an airbag ECU 3, a cruise ECU 4, and an engine ECU 5 via an in-vehicle network, which is, for example, a controller area network (CAN) 2.

The airbag ECU 3 includes a microcomputer 3a provided with a CPU, ROM, and RAM (none shown). The microcomputer 3a has an airbag control section 3b, which can act as a known airbag control means and which controls an ignition device (target of control) for inflating an airbag upon detection of a vehicle collision.

The microcomputer 3a further acts as a storage control device 30. The storage control device 30 includes a behavior determination section 31 acting as a behavior determination means, a storage control section 32 acting as a storage control means, and a correction section 33 acting as a correction means, each or some of which may be configured by software of the microcomputer 3a. The storage control device 30 further includes a nonvolatile memory 34 connected to the microcomputer 3a. The nonvolatile memory 34 includes a rewritable flash memory. The microcomputer 3a may be also called a controller.

The airbag ECU 3 is configured to receive sensor signals detected by an accelerator opening sensor 6 and vehicle speed sensor 7 from an engine ECU 5 via the CAN 2.

The cruise ECU 4 includes a microcomputer (not shown) provided with a CPU, ROM, and RAM. When a control start switch (not shown) is turned on, the cruise ECU 4 starts cruise control. In the cruise control, computing necessary for control is performed based on, for example, sensor signals from the vehicle speed sensor 7. In addition, a request command, for example, for constant speed travel control or acceleration/deceleration control is issued to the engine ECU 5, which is the control target. The cruise ECU 4 also functions as a storage control device 41 provided with a nonvolatile memory 44. The storage control device 41 includes a determination result presentation section 40, which can act as a determination result presentation means. The microcomputer of the cruise ECU 4 may act as the storage control device 41, which may be also called a controller.

The engine ECU 5 adjusts, based on the request command received from another ECU, the opening of a throttle valve (actuator), which is an example of a control target, according to sensor signals from the accelerator opening sensor 6 and vehicle speed sensor 7. The cruise ECU 4 also controls a transmission and a brake system (neither shown).

The cruise ECU 4 performs processing shown in FIG. 2 which includes: cruise control processing for causing, in accordance with instructions from the driver, the vehicle speed to approach a target value; determination processing for determining whether the vehicle speed change rate (hereinafter also referred to simply as the "change rate") is attributed to cruise control performed by the cruise ECU 4; and post-processing for outputting a determination result is outputted and for recording vehicle information or control information in the cruise ECU 4. The "vehicle information" refers to, for example, information inputted to the cruise ECU 4 based on data detected by various sensors. The "control information" refers to, for example, information such as control commands outputted from the cruise ECU 4 to the actuator and another ECU.

A determination of "whether the vehicle speed change rate is attributed to the cruise control performed by the cruise ECU 4", which determination is made in the above determination processing, is synonymous with a determination of "whether the vehicle speed change rate expected by the cruise ECU 4 can be acquired." Namely, a behavior unexpected by an ECU is a behavior the cause of which cannot be determined based on the information that the ECU is having. In cases where an ECU performs control processing for outputting a control command to another ECU, the information that the ECU is having refers to the control command, sensor information, and a determination result from another ECU. Since the cruise ECU 4 performs the control processing, the control command corresponds to a request command (described later) and the sensor information corresponds to a sensor signal received from the vehicle speed sensor 7.

In cases where an ECU does not perform the control processing for outputting the control command to another ECU, the information that the ECU is having refers to the sensor information and the determination result from another ECU.

For the airbag ECU 3, for example, the sensor information corresponds to a sensor signal received from the vehicle speed sensor 7.

Figure 2:
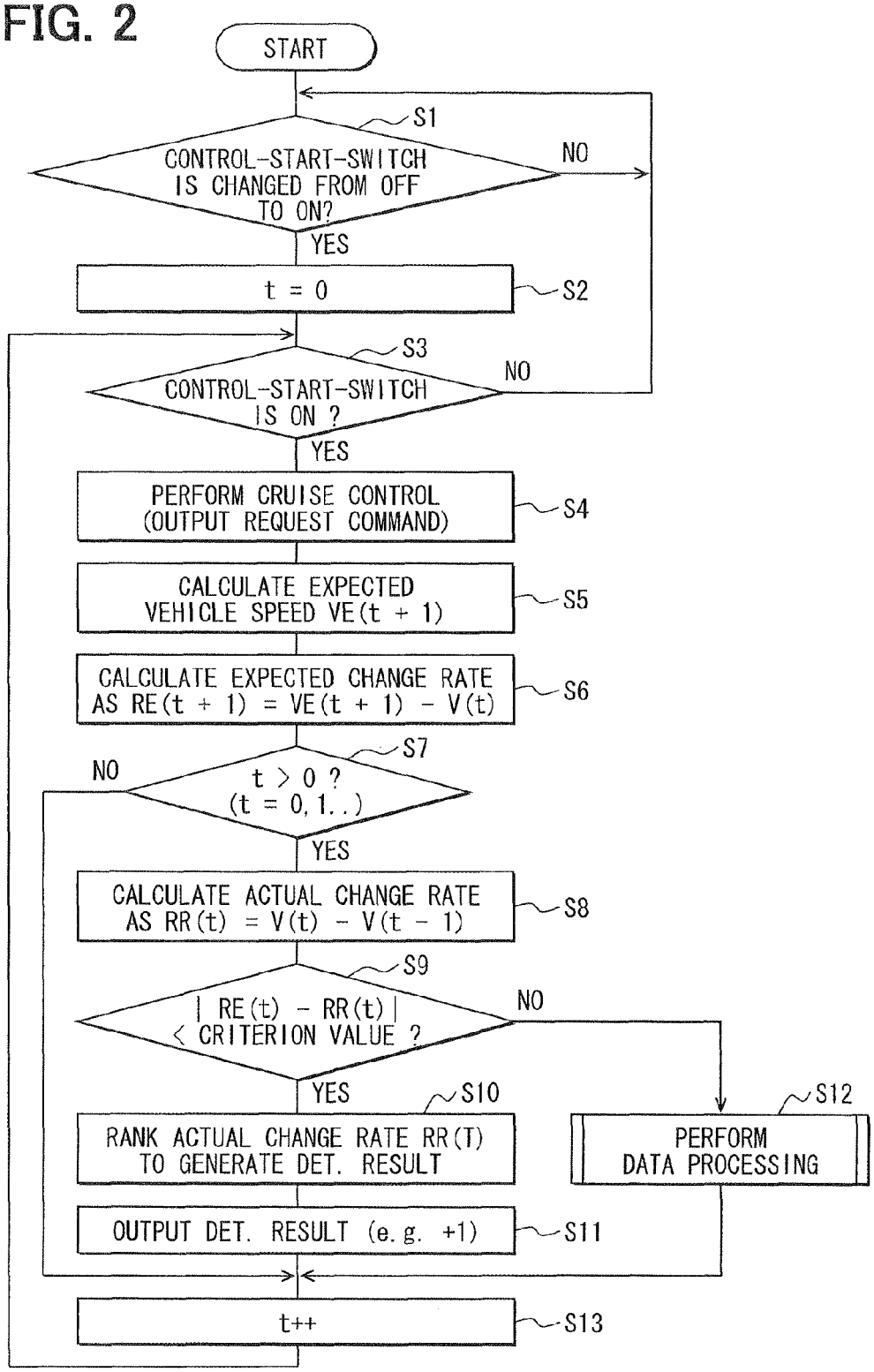
FIG. 2 is a flowchart of control performed by a cruise ECU.

Explanation returns to FIG. 2. The processing shown in FIG. 2 is performed at a predetermined period, for example, every Δt second (in the present example, Δt=1 second). The vehicle driver inputs a target vehicle speed when he/she operates the control start switch or within a predetermined time after operating the control start switch. In the processing shown in FIG. 2, it is assumed for simplification that a target vehicle speed is set by the driver when the driver turns the control start switch on.

In step S1 shown in FIG. 2, whether or not the state of the control start switch has changed from off to on is determined. When it is determined that the control start switch has been turned on by the driver, processing advances to step S2. When it is determined that the control start switch is left off without being operated by the driver, processing does not advance and turning on of the control start switch is awaited.

In step S2 following step S1, an elapsed time count t is initialized to 0. The elapsed time count t represents the time that has elapsed after turning on of the control start switch (t=0 when the control start switch is turned on).

In step S3, whether or not the control start switch is left on is determined. When the control start switch is left on, processing advances to step S4; otherwise, processing returns to step S1.

In step S4, cruise control processing is performed. The cruise control processing is performed to so that the vehicle speed approaches a target vehicle speed set by the driver. For example, when the target vehicle speed set by the driver is higher than the current vehicle speed, a request command instructing an increase in engine torque is outputted to the engine ECU 5. When the target vehicle speed set by the driver is lower than the current vehicle speed, a request command instructing a decrease in the engine torque is outputted to the engine ECU 5.

In step S5 following step S4, an expected vehicle speed after Δt second VE(t+1) is calculated based on a request command and the current vehicle speed V(t). The expected vehicle speed VE(t+1) represents an expected vehicle speed after a predetermined time Δt on the assumption that control is normally performed by the cruise ECU 4 as ordered by the driver and that there is no disturbance such as a sudden change in vehicle angularity.

In step S6 following step S5, an expected vehicle speed change rate RE(t+1) is calculated. The expected vehicle speed change rate RE(t+1) represents the difference between an expected vehicle speed VE(t+1) at the time(t+1), which is a time after passage of a predetermined time Δt from the current time t, and the current vehicle speed V(t). In other words, the expected vehicle speed change rate RE(t+1) represents the degree of vehicle speed change during a predetermined time Δt counted from the current time.

In step S7 following step S6, whether or not the current elapsed time count t is larger than 0 is determined. In the above the elapsed time count 0 (t=0) represents the time when the control start switch is turned on. In other words, it is determined whether or not a predetermined time Δt has passed after turning on of the control start switch. When it is determined that the current elapsed time count t is larger than 0, processing advances to step S8; otherwise, processing advances to step S13. Namely, step S7 is provided to branch processing so as to skip calculating the below-described actual change rate, which need not be calculated when step S7 is reached for the first time after the control start switch is turned on. In step S13, the elapsed time count t is incremented by 1 and processing returns to step S3.

In step S8, an actual change rate RR(t) is calculated by subtracting the vehicle speed V(t−1) a predetermined Δt ago, from the current vehicle speed V(t). The processing of step S8 is performed only when the elapsed time count t is larger than 0 (i.e. when the elapsed time count t is 1 or larger), so that the vehicle speed V(t−1) always represents a vehicle speed after cruise control is started.

In step S9 following step S8, whether or not the absolute value of the difference between the expected change rate RE(t) and the actual change rate RR(t) is smaller than a criterion value is determined. When it is determined that the absolute value of the difference between the expected change rate RE(t) and the actual change rate RR(t) is smaller than the criterion value, processing advances to step S10; otherwise (difference not smaller than the predetermined value), processing advances to step S12. When the absolute value of the difference between the expected change rate RE(t) and the actual change rate RR(t) is smaller than the criterion value, it indicates that the cruise control performed according to a request command issued Δt ago has caused the vehicle to behave as expected by the cruise ECU 4 Δt ago. When the absolute value of the difference between the expected change rate and the actual change rate is not smaller than the criterion value, it indicates that, even though the cruise ECU 4 outputted a request command Δt ago, the vehicle has not behaved as expected by the cruise ECU 4. Namely, an unexpected vehicle behavior has occurred.

In step S10, since the vehicle behavior has been as expected by the cruise ECU 4, the actual change rate RR(t) is ranked.

Specifically, the actual change rate RR(t) is ranked in "+1", "+2", "+3", "−1", "−2", or "−3". Rank +1 is for a speed increase of 5 km/h or more but below 10 km/h; rank +2 is for a speed increase of 10 km/h or more but below 15 km/h; and rank +3 is for a speed increase of 15 km/h or more. Rank −1 is for a speed decrease of 5 km/h or more but below 10 km/h; rank −2 is for a speed decrease of 10 km/h or more but below 15 km/h; and rank −3 is for a speed decrease of 15 km/h or more.

In step S11 following step S10, a result of ranking is transmitted as a determination result to the CAN 2 by a determination result providing section 40 (determination result providing means). Next, in step S13, the elapsed time count t is incremented by 1, and processing returns to step S3.

Figure 4:
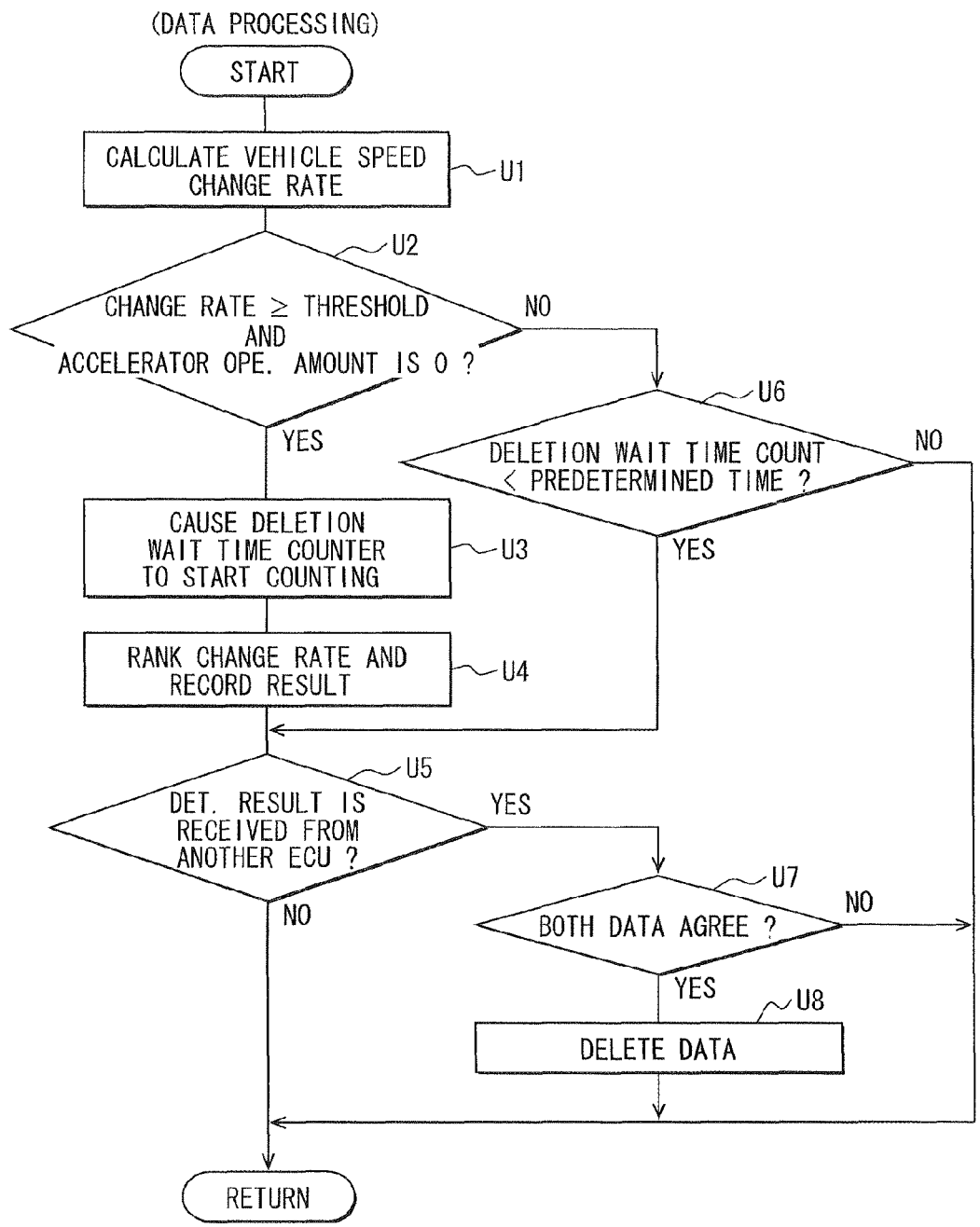
FIG. 4 is a flowchart of data processing.

In step S12, since a unexpected behavior, which is unexpected by the cruise ECU 4, has occurred, data processing similar to that will be described later with reference to FIG. 4 is performed. In the processing performed in step S12, whether or not the unexpected behavior of the vehicle is attributed to control performed by another ECU is determined. When it is determined that the unexpected behavior is not attributed to the control performed by any other ECU, the vehicle information and control information is stored in a nonvolatile RAM (not shown), and processing advances to step S13. In step S13, the elapsed time count t is incremented by 1, then processing returns to step S3.

As described above, the cruise ECU 4 determines whether or not the unexpected behavior has occurred during the cruise control. When it is determined that the vehicle behavior has been as expected by the cruise ECU 4, the cruise ECU 4 ranks the actual change rate RR(t) and transmits the result of ranking as a determination result to the CAN 2. Namely, the cruise ECU 4 outputs the determination result to inform another ECU that the behavior change represented by a speed change (the actual change rate) is attributed to the cruise control performed by the cruise ECU 4.

Figure 3:
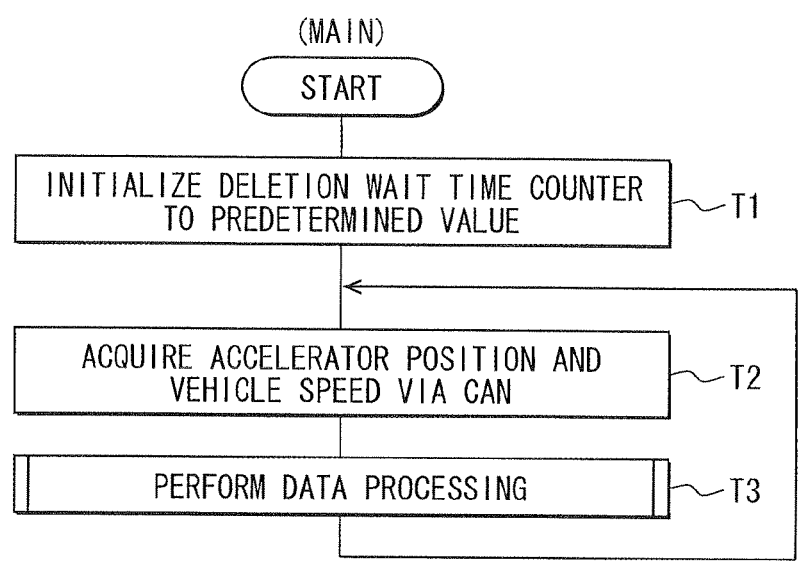
FIG. 3 is a flowchart of control performed by a storage control device.

The airbag ECU 3 performs storage control shown in FIGS. 3 and 4. FIG. 3 shows a main routine of the storage control. First, in step T1, a deletion wait time counter is initialized to a predetermined time, for example, 5 seconds. Next, in step T2, sensor signals are acquired from the accelerator opening sensor 6 and vehicle speed sensor 7 via the CAN 2. In step 3, the data given by the sensor signals is processed (step T3).

FIG. 4 shows the data processing performed in step T3 as a subroutine. First, in the subroutine, in step U1, a rate of change in the vehicle speed (increase or decrease) from Δt ago is calculated based on the sensor information received from the vehicle speed sensor 7. Next, in step U2, it is determined by the behavior determination section 31 (behavior determination means) whether or not the calculated change rate meets the conditions for determining occurrence of an unexpected behavior. For example, it is determined whether the accelerator opening is 0 and the change rate satisfies a predetermined value (a speed increase of 5 km/h or more).

When it is determined that the change rate indicates an unexpected behavior, corresponding to YES in step U2, processing proceeds to U3. In step U3, the deletion wait time counter starts counting. In step U4, the vehicle speed change rate (vehicle information) is ranked, In addition, the rank is stored in the nonvolatile memory 34 to by the storage control section 32 (storage control means). The vehicle speed change rate is ranked in +1, +2, or +3. Rank +1 is for a speed increase of 5 km/h or more but below 10 km/h; rank +2 is for a speed increase of 10 km/h or more but below 15 km/h; and rank +3 is for a speed increase of 15 km/h or more. Since step U4 is performed only when the vehicle speed has increased, the vehicle speed change rate is ranked in a class corresponding to a speed increase.

A storage area of the nonvolatile memory 34 for storing vehicle information is arranged to store three data of the vehicle information. When storing an additional data after the storage area for three data is filled, the oldest one of the three data is overwritten with the additional data.

In step U5, it is determined whether a determination result has been received from another ECU via the CAN 2. When a determination result has been received, corresponding to YES in step U5, processing advances to step U7. In step U7, it is determined whether the received determination result, which is a result of the ranking of the actual change rate provided in the foregoing step S10, agrees with the stored data, which is the result of the ranking of the change rate provided in in the foregoing step U4. When they agree, corresponding to YES in step U7, the vehicle information stored as described above is deleted in step U8. Steps U7 and U8 are performed by the correction section 33 (correction means).

When it is determined in step U5 that no determination result has been received from any other ECU (i.e. determination result in step U5 is NO), the subroutine shown in FIG. 4 is exited and processing returns to the main routine shown in FIG. 3. Namely, the vehicle information stored is not deleted and is left readable. After processing returns to the main routine, step T2 is performed, then processing advances to step U1 of the subroutine. When the result of step U2 following step U1 is NO, namely, when the vehicle behavior is not determined unexpected, whether or not the count of the deletion wait time counter has reached a predetermined time length of, for example, 5 seconds is determined in step U6. When the count is 5 seconds or larger, processing immediately returns to the main routine. When the count is smaller than 5 seconds (result of step U6 is YES), processing advances to step U5.

As described above, when, the storage control device 30 determines that an unexpected behavior has occurred, the relevant vehicle information (e.g., speed change rate) is stored in the nonvolatile memory 34. Subsequently, when a determination result indicating that the behavior has been as expected by another ECU is received (provided) from the ECU within a predetermined period of time, the vehicle information stored as corresponding to the unexpected behavior, which is unexpected by the storage control device 30, is deleted. The expected behavior, which is a behavior as expected by another ECU, refers to a behavior that is expected to occur as a result of the control processing performed by the another ECU based on an order given by the driver.

According to the above embodiment, when the behavior determination section 31 of the storage control device 30 determines that an unexpected behavior has occurred, the relevant vehicle information is once stored in the nonvolatile memory 34. However, when it is subsequently determined that the unexpected behavior determined by the behavior determination section 31 is attributed to control processing performed by the cruise ECU 4, it is determined that the unexpected behavior is merely a result of the control processing performed based on an order given by the driver and that the behavior once determined as unexpected is a normal behavior for the vehicle as a whole. As a result, the vehicle information stored as corresponding to the unexpected behavior is deleted, so that only the vehicle information suitable for analysis is left in the nonvolatile memory 34 to enable appropriately analysis of an unexpected behavior. Namely, vehicle information corresponding to a behavior (behavior expected by none of the ECUs in the vehicle) not ordered by the driver, i.e. not attributed to control processing performed by any ECU normally functioning in the vehicle is eventually stored in the nonvolatile memory 34.

Furthermore, when a behavior change is attributed to control processing performed by the cruise ECU 4, the determination result providing section 40 included in the cruise ECU 4 transmits a determination result corresponding to the relevant control processing to the CAN 2. In this way, as compared with cases in which a determination result as to whether a behavior change is attributed to control processing performed by the cruise ECU 4 itself is transmitted at predetermined regular intervals, communication over the CAN 2 is prevented from getting congested. This allows smooth communications between the cruise ECU 4 and another ECU or between a behavior sensor and an ECU.

Instead of the deletion processing performed in the foregoing step U8, overwrite permission processing may be performed. The overwrite permission processing permits overwriting the stored data but prohibits the data from being read. Therefore, vehicle data permitted to be overwritten is prevented from being used as vehicle information corresponding to an unexpected behavior.

According to the present embodiment, the storage control device 30 is provided in the airbag ECU 3 that is of a type different from the cruise ECU 4 and engine ECU 5. This allows the airbag ECU 3 to use the behavior determination section 31, the storage control section 32, and the correction section 33 of the storage control device 30.

The storage control device 30 may be provided discretely from the ECUs 3, 4, and 5.

In the first embodiment, both of the vehicle information corresponding to an unexpected behavior and the determination result transmitted from the cruise ECU 4 are ranked. Processing may, however, be arranged so as to rank only either one of the vehicle information and the determination result. In this case, the other one of the vehicle information and the determination result may not be ranked. In addition, it may be determined whether the other one falls in a range of the ranked data, in order to determine whether the vehicle information and the determination result agree with each other. Furthermore, without ranking both data, it may be determined whether both data agrees with each other.

Also, the vehicle information corresponding to an unexpected behavior may be stored without being ranked in the nonvolatile memory 34, and the stored data may be ranked when it is compared with a received determination result.

The above description is based on an example where the storage control device 30 is included in the airbag ECU 3, and the nonvolatile memory 34 stores not the control information but the vehicle information. It goes without saying, however, that the nonvolatile memory 44 included in the storage control device 41 of the cruise ECU 4, which outputs the control commands to another ECU, may store not only the vehicle information but also the request commands (control commands) outputted from the cruise ECU 4 to the engine ECU 5. The control information such as learned data for use in control processing may also be stored in the nonvolatile memory 44.

Even though, in the processing performed by the cruise ECU 4 as shown in FIG. 2, step S9 for determining whether or not an unexpected behavior has occurred is performed every time cruise control is performed in step S4, step S9 need not necessarily be performed every time cruise control is performed in step S4. Processing may be arranged so that step S9 is performed once every several times of execution of step S9.

Even though, in the processing performed by the cruise ECU 4 as shown in FIG. 2, the difference between an expected change rate and an actual change rate is calculated in step S9, the difference between the expected vehicle speed VE(t) calculated in step S5 in the previous control cycle (t−1) and the current vehicle speed VE(t) may be calculated in step S9. Alternatively, the expected change rate may be defined as $(VE(t+1)-V(t))/\Delta t$, which is an expected vehicle speed VE(t+1) minus the current vehicle speed V(t) divided by $\Delta t$. In addition, the actual change rate may be defined as $(V(t)-V(t-1))/\Delta t$, which is a vehicle speed V(t) minus a vehicle speed V(t−1) divided by $\Delta t$. Alternatively, the subtraction of the vehicle speed at the previous control cycle (t−1) from the current vehicle speed may not be performed. The subtracting the vehicle speed a predetermined time period ago from the current vehicle speed and the dividing of subtraction result by the predetermined time period enable a comparison between an expected change rate and an actual change rate, even though the two rates are based on different lengths of time. Similarly, the result of determination by the cruise ECU 4 (i.e. the actual change rate) and the change rate calculated by the airbag ECU 3 may be based on different lengths of time provided that the different lengths of time partly overlap.

<Second Embodiment>

Figure 5:
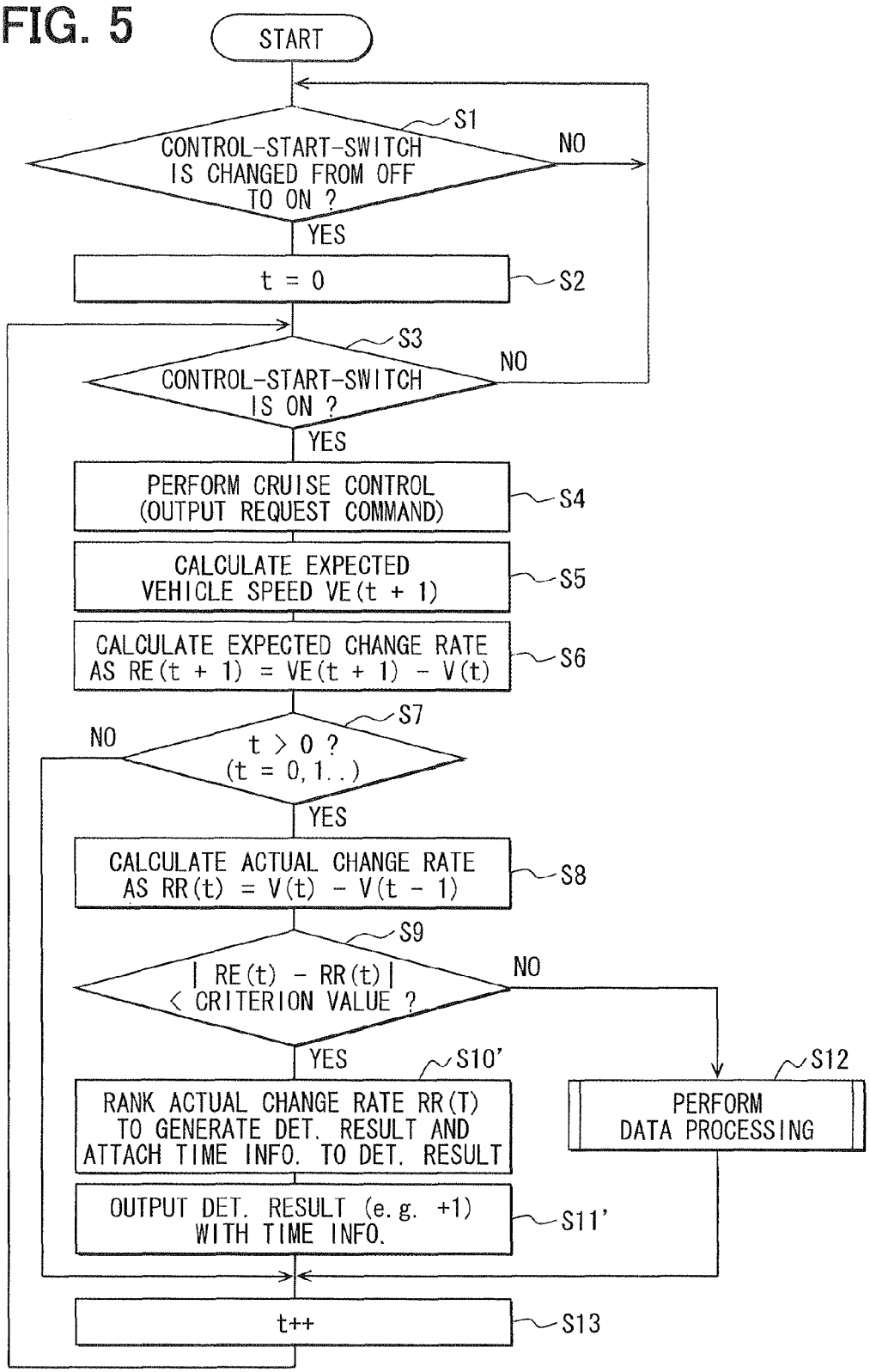
FIG. 5 is a flowchart of control performed by a cruise ECU according to a second embodiment.
Figure 6:
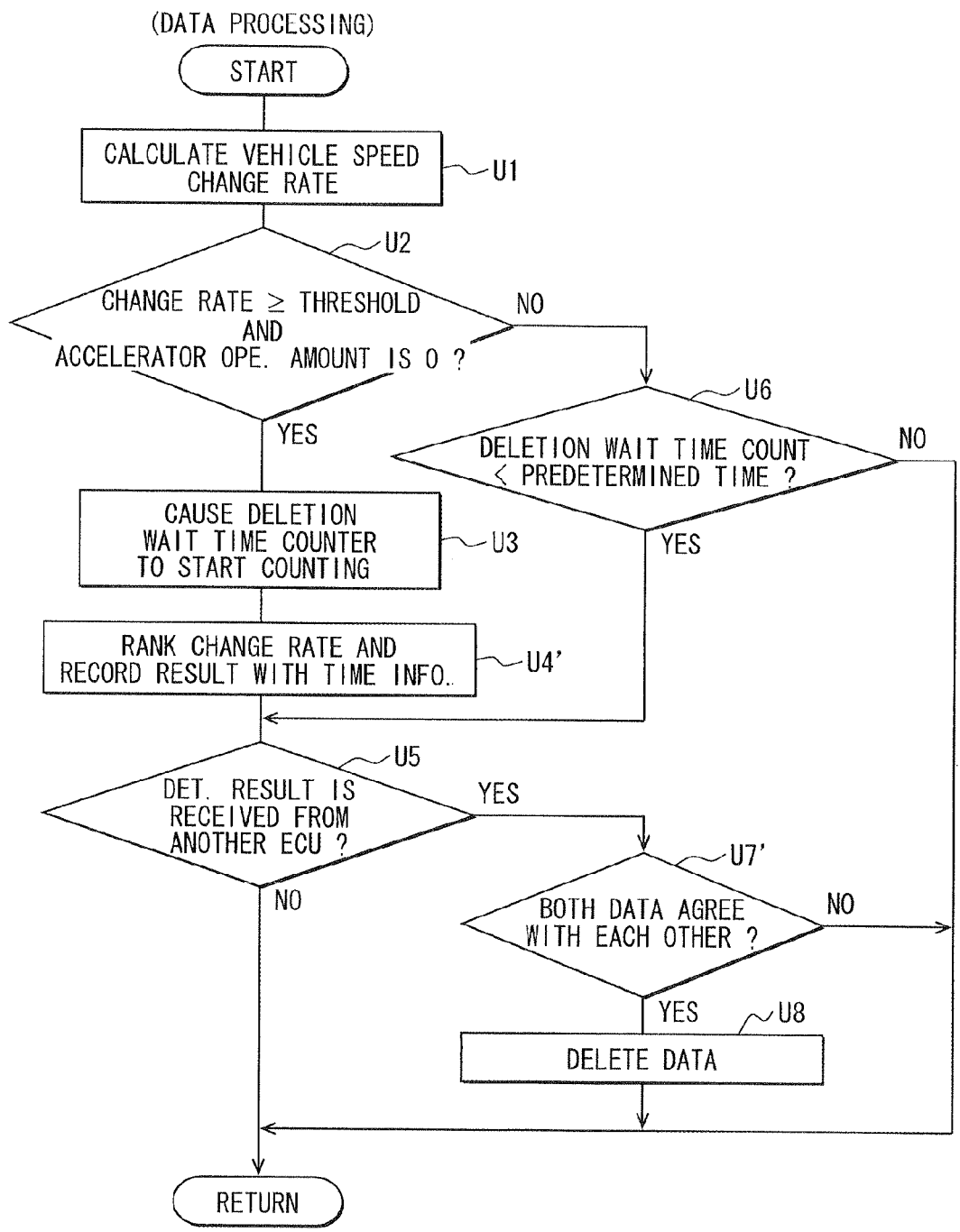
FIG. 6 is a flowchart of data processing according to the second embodiment.

FIGS. 5 and 6 show a second embodiment. The second embodiment differs from the first embodiment in that the storage control device 30 and the cruise ECU 4 have common time information and in that the time information is attached to a determination result. The aspects of the second embodiment differing from the first embodiment will be described below. As shown in FIG. 5, in the control performed by the cruise ECU 4, the time information is attached to a determination result, i.e. a determined rank, in step S10'. Then, in step S11', the determination result attached with the time information is transmitted to the CAN 2.

As shown in FIG. 6, in the data processing performed by the storage control device 30, the ranked vehicle information corresponding to an unexpected behavior is, in step U4', attached with the time information and stored. When it is determined, in step U7', that both data as well as both time information agrees, the vehicle information stored in step U4' is deleted in step U8.

According to the second embodiment, it is determined, in addition to whether or not the vehicle information corresponding to an unexpected behavior stored by the storage control device 30 and a determination result presented by the cruise ECU 4 agree, whether or not the time information attached to both data agrees. In this way, from the viewpoint of a vehicle as a whole (i.e., all ECUs), it is possible to accurately determine whether or not an unexpected behavior has occurred.

Furthermore, the time information is attached to the vehicle information to be stored in the nonvolatile memory 34 and the time information is attached also to the determination result (vehicle information) received from another ECU, so that the vehicle information and the determination result can be compared based on the same time information. Therefore, even in cases where the same vehicle information has been stored in the nonvolatile memory 34 a plural number of times, the vehicle information corresponding to a specific determination result can be accurately deleted.

<Third Embodiment>

Figure 7:
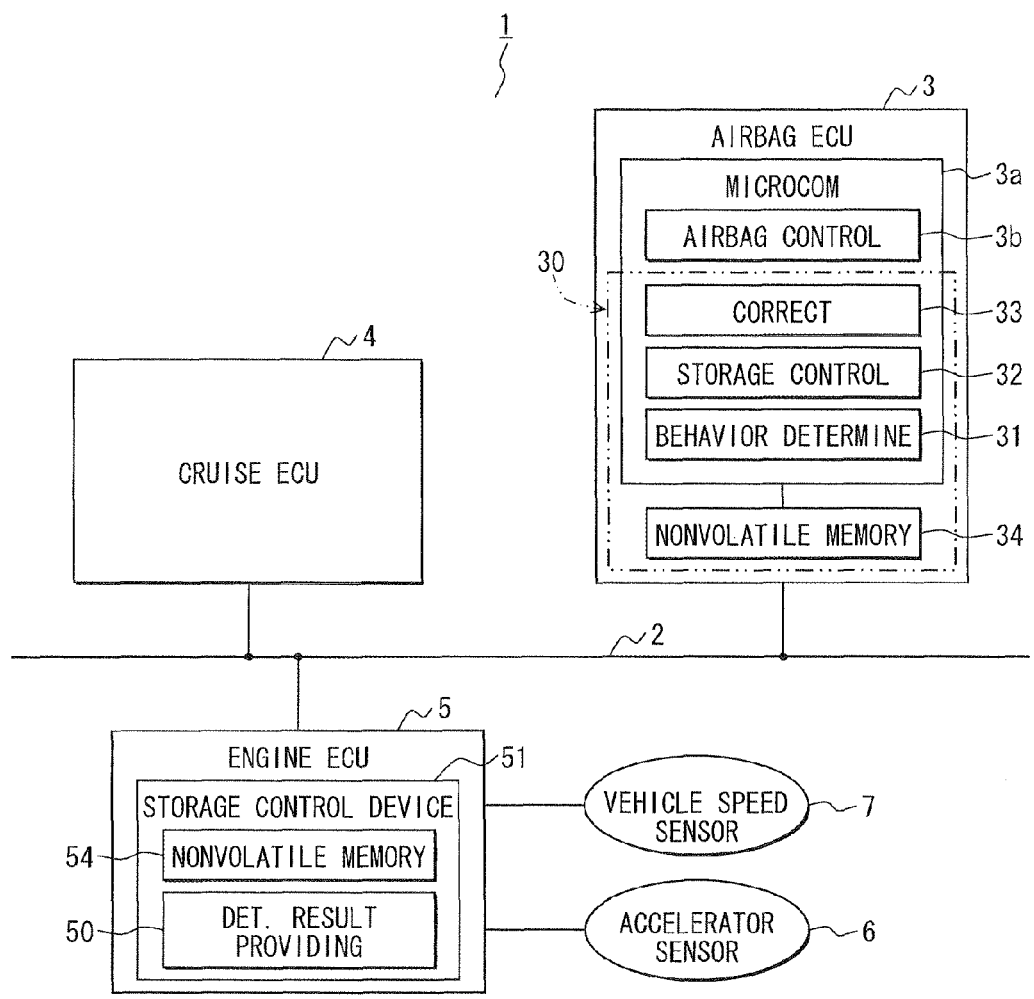
FIG. 7 is a functional block diagram of a vehicle behavior data storage control system according to a third embodiment.

FIG. 7 shows a third embodiment. In the third embodiment, besides the airbag ECU 3 including the storage control device 30, multiple ECUs such as the cruise ECU 4, the engine ECU 5 and the like are provided as in the first embodiment. The engine ECU 5 controls a throttle valve, which is an actuator, based on the data (sensor signals) received from the accelerator opening sensor 6 and vehicle speed sensor 7 which are behavior sensors. The cruise ECU 4 receives no data directly from the vehicle speed sensor 7 acting as the behavior sensor. The cruise ECU 4 only receives data (a sensor signal) generated by the vehicle speed sensor 7 from the engine ECU 5 via the CAN 2 and outputs a request command to the engine ECU 5. The engine ECU 5 and the cruise ECU 4 respectively correspond to "a first ECU" and "a second ECU".

In the third embodiment, unlike in the first embodiment, the cruise ECU 4 does not include the storage control device 41, the nonvolatile memory 44 and the determination result presentation section 40. Instead, the engine ECU 5 includes a storage control device 51 similar to the storage control device 41, a nonvolatile memory 54 similar to the nonvolatile memory 44, and a determination result presentation section (means) 50 similar to the determination result presentation section 40. When a determination result is generated in the engine ECU 5, it is transmitted to the CAN 2. Based on the torque request commands received from the cruise ECU 4 and another ECU (for example, an air-conditioner ECU), the engine ECU 5 determines a target opening of an electronic control throttle, not shown, and outputs a control command to the electronic control throttle.

The engine ECU 5 calculates an expected change rate based on the vehicle speed after a predetermined period of time that is forecast based on the control command outputted to the electronic control throttle. The engine ECU 5 also calculates an actual change rate over a predetermined period of time based on a sensor signal received from the vehicle speed sensor 7 and compares the calculated actual change rate with the expected change rate to determine whether or not an unexpected behavior, which is unexpected by the engine ECU, 5 has occurred.

According to the third embodiment, a determination result is transmitted from the engine ECU 5 directly controlling the actuator, so that the accuracy of determination result presentation can be enhanced.

<Fourth Embodiment>

Figure 8:
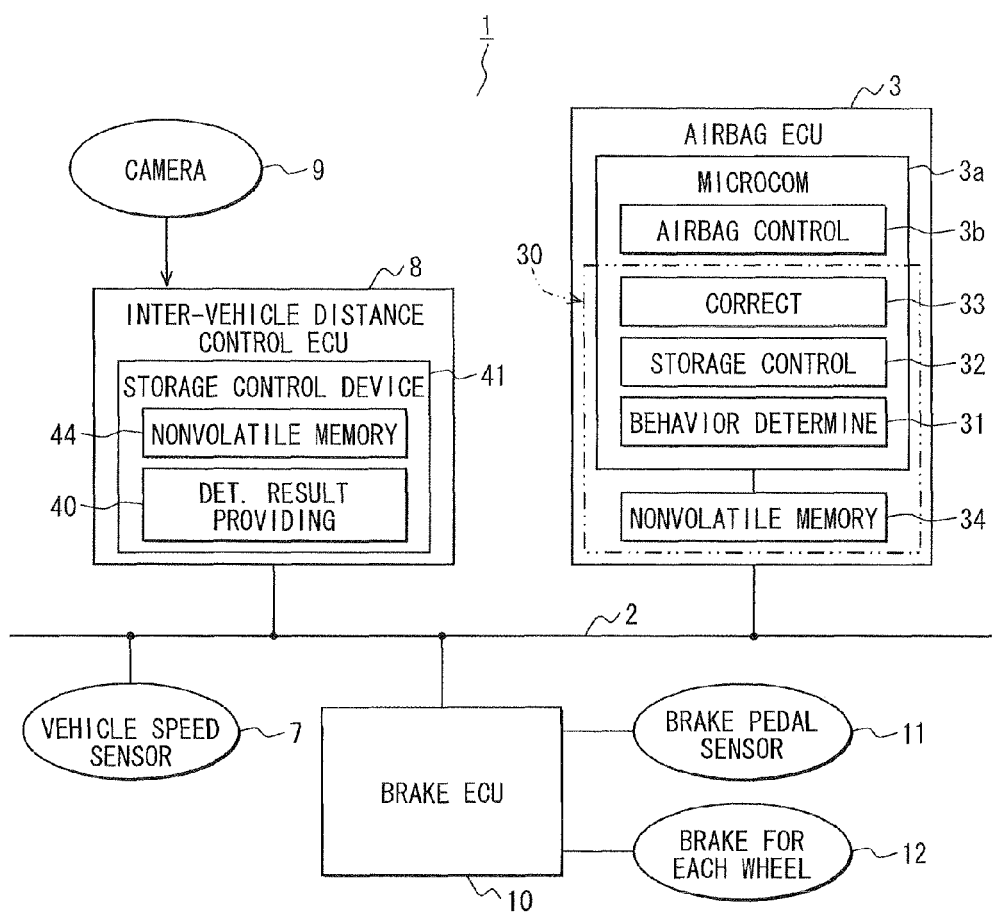
FIG. 8 is a functional block diagram of a vehicle behavior data storage control system according to a fourth embodiment.
Figure 9:
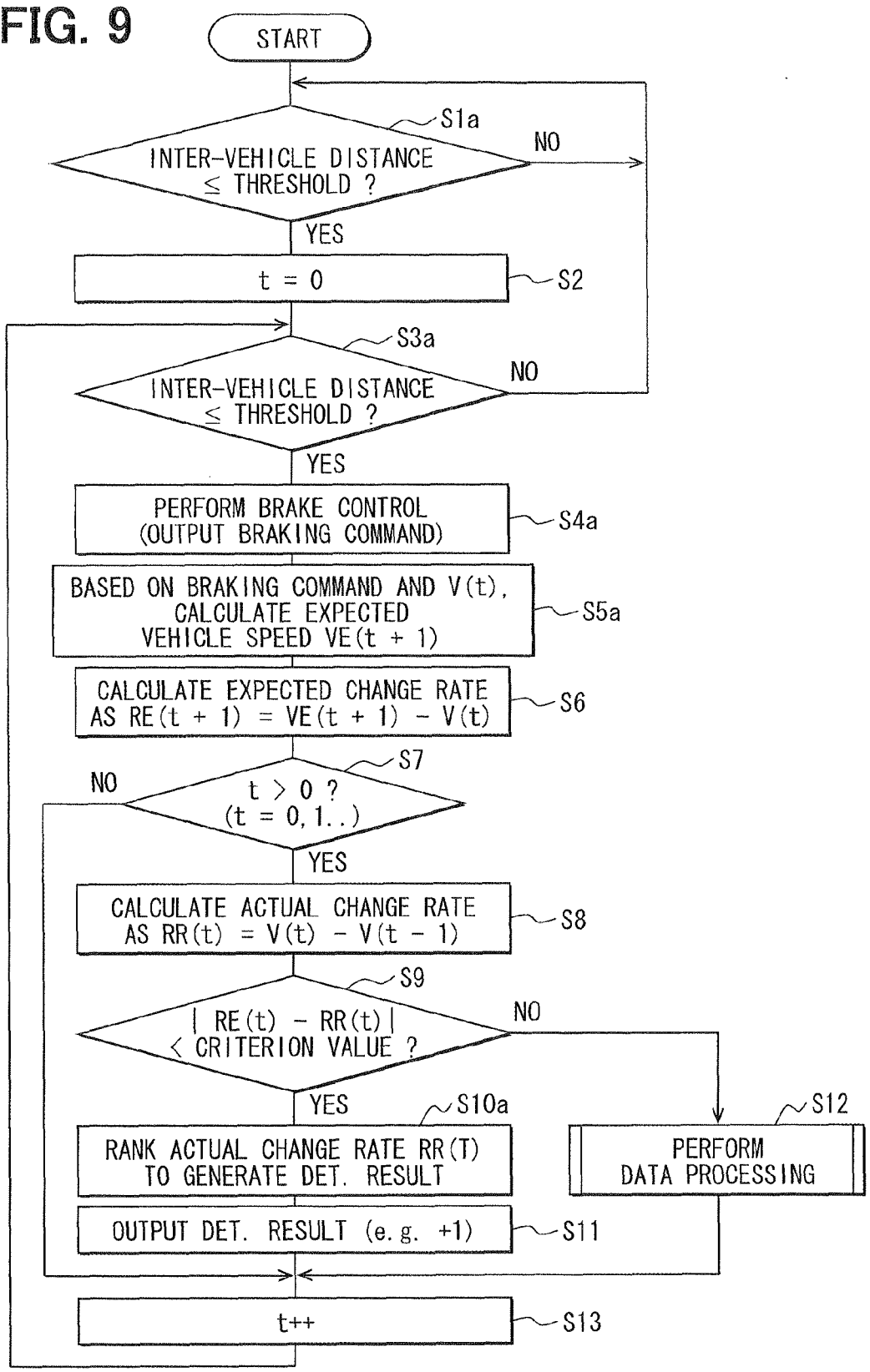
FIG. 9 is a flowchart of control performed by an inter-vehicle distance control ECU.

A fourth embodiment will be described below with reference to FIGS. 8 to 10. In the fourth embodiment, an inter-vehicle distance control electronic control unit (ECU) 8 is connected to the in-vehicle network CAN.

The inter-vehicle distance control ECU 8 detects, based on image information from a stereo camera 9, the distance to a vehicle traveling directly ahead. When the detected inter-vehicle distance is shorter than a predetermined value, the inter-vehicle distance control ECU 8 outputs a braking command to a brake ECU 10, which is connected to the CAN 2, to perform a vehicle braking to avoid, for example, a collision. Like the foregoing cruise ECU, the inter-vehicle distance control ECU 8 is equipped with the storage control device 41.

The brake ECU 10 is electrically connected to a brake pedal sensor 11 which detects the depth to which the brake pedal, not shown, is depressed (brake pedal depression depth) and outputs the detected brake pedal depression depth to the CAN 2. The brake ECU 10 also controls a hydraulic unit, typically ABS, provided with a brake fluid pressurization source (pump) for pressurizing a brake fluid, a pressure reducing valve, and a pressure increasing valve. The brake ECU 10 controls, via a hydraulic unit, the pressure of hydraulic oil sent to the piston of the brake caliper for each wheel. In FIG. 8, the brake ECU 10 is represented, for convenience sake, as being connected to the brake for each wheel 12. When a braking command is received from the inter-vehicle distance control ECU 8, the brake ECU 10 operates the brake for each wheel 12 via the hydraulic unit to decelerate the vehicle.

Next, the logic of control performed by the inter-vehicle distance control ECU 8 will be described with reference to FIG. 9. In step S1a shown in FIG. 9, whether or not the inter-vehicle distance determined based on the image information from the stereo camera 9 is within a predetermined value is determined. When the inter-vehicle distance is within the predetermined value, processing advances to step S2. When the inter-vehicle distance is not within the predetermined distance, decreasing of the inter-vehicle distance to within the predetermined value is awaited.

In step S2 following step S1, an elapsed time count t is initialized to 0. The elapsed time count t represents the time that has elapsed after decreasing of the inter-vehicle distance to within the predetermined value.

In step S3a, whether or not the inter-vehicle distance is within the predetermined value is determined. When the inter-vehicle distance is within the predetermined value, processing advances to step S4a; otherwise, processing returns to step S1a.

In step S4a, brake control is performed. When brake control is performed, a braking command is outputted to the brake ECU 10, so that, even when the brake pedal is not stepped on by the driver, the vehicle is forcedly decelerated.

In step S5a following step S4a, an expected vehicle speed VE(t+1) after Δt second is calculated based on the braking command and the current vehicle speed V(t). The expected vehicle speed VE(t+1) represents a vehicle speed after a predetermined time Δt forecast on the assumption that the inter-vehicle distance control ECU 8 normally performs control as ordered by the driver and that no disturbance such as a sudden change in vehicle angularity occurs.

In step S6 following step S5a, an expected change rate RE(t+1) is calculated. The expected change rate RE(t+1) represents the difference between an expected vehicle speed VE(t+1) at the time(t+1) reached when a predetermined time Δt passes from the current time t and the current vehicle speed V(t). In other words, the expected change rate RE(t+1) represents the degree of vehicle speed change (a speed decrease in the present example) during a predetermined time Δt counted from the current time t.

In step S7 following step S6, whether or not the current elapsed time count t is larger than 0 is determined in which an elapsed time count 0 (t=0) represents when the inter-vehicle distance changed from being larger than a predetermined value to being not larger than the predetermined value. When it is determined that the current elapsed time count t is larger than 0, processing advances to step S8; otherwise, processing advances to step S13. Namely, step S7 is provided to branch processing so as to skip calculating an actual change rate, being described later, which need not be calculated when step S7 is reached for the first time after decreasing of the inter-vehicle distance to or below the predetermined value. In step S13, the elapsed time count t is incremented by 1 and processing returns to step S3.

In step S8, the actual change rate RR(t) is calculated by subtracting the vehicle speed V(t−1) Δt ago from the current vehicle speed V(t). The processing of step S8 is performed only when the elapsed time count t is larger than 0 (i.e. when the elapsed time count t is 1 or larger), so that the vehicle speed V(t−1) always represents a vehicle speed after decreasing of the inter-vehicle distance to or below the predetermined value.

In step S9 following step S8, whether or not the absolute value of the difference between the expected change rate RE(t) and the actual change rate RR(t) is smaller than a criterion value is determined. When it is determined that the absolute value of the difference between the expected change rate RE(t) and the actual change rate RR(t) is smaller than the criterion value, processing advances to step S10a; otherwise, processing advances to step S12. That the absolute value of the difference between the expected change rate RE(t) and the actual change rate RR(t) is smaller than the criterion value means that the brake control performed according to the braking command issued Δt ago has caused the vehicle to behave as expected by the inter-vehicle distance control ECU 8 Δt ago. On the other hand, when the absolute value of the difference between the expected change rate and the actual change rate is equal to or larger than the criterion value, it is indicated that the vehicle has not behaved as expected by the inter-vehicle distance control ECU 8 when the braking command was issued Δt ago. Namely, an unexpected vehicle behavior has occurred.

In step S10a reached when the vehicle behavior has been as expected (forecast) by the inter-vehicle distance control ECU 8, the actual change rate RR(t) is ranked.

The rank to be determined is selected from −1, −2, and −3. Rank −1 is for a speed decrease of 5 km/h or more but below 10 km/h; rank −2 is for a speed decrease of 10 km/h or more but below 15 km/h; and rank −3 is for a speed decrease of 15 km/h or more.

In step S11 following step S10a, the result of ranking is transmitted as a determination result to the CAN 2 (determination result providing means 40). Next, in step S13, the elapsed time count t is incremented by 1, and processing returns to step S3.

Figure 10:
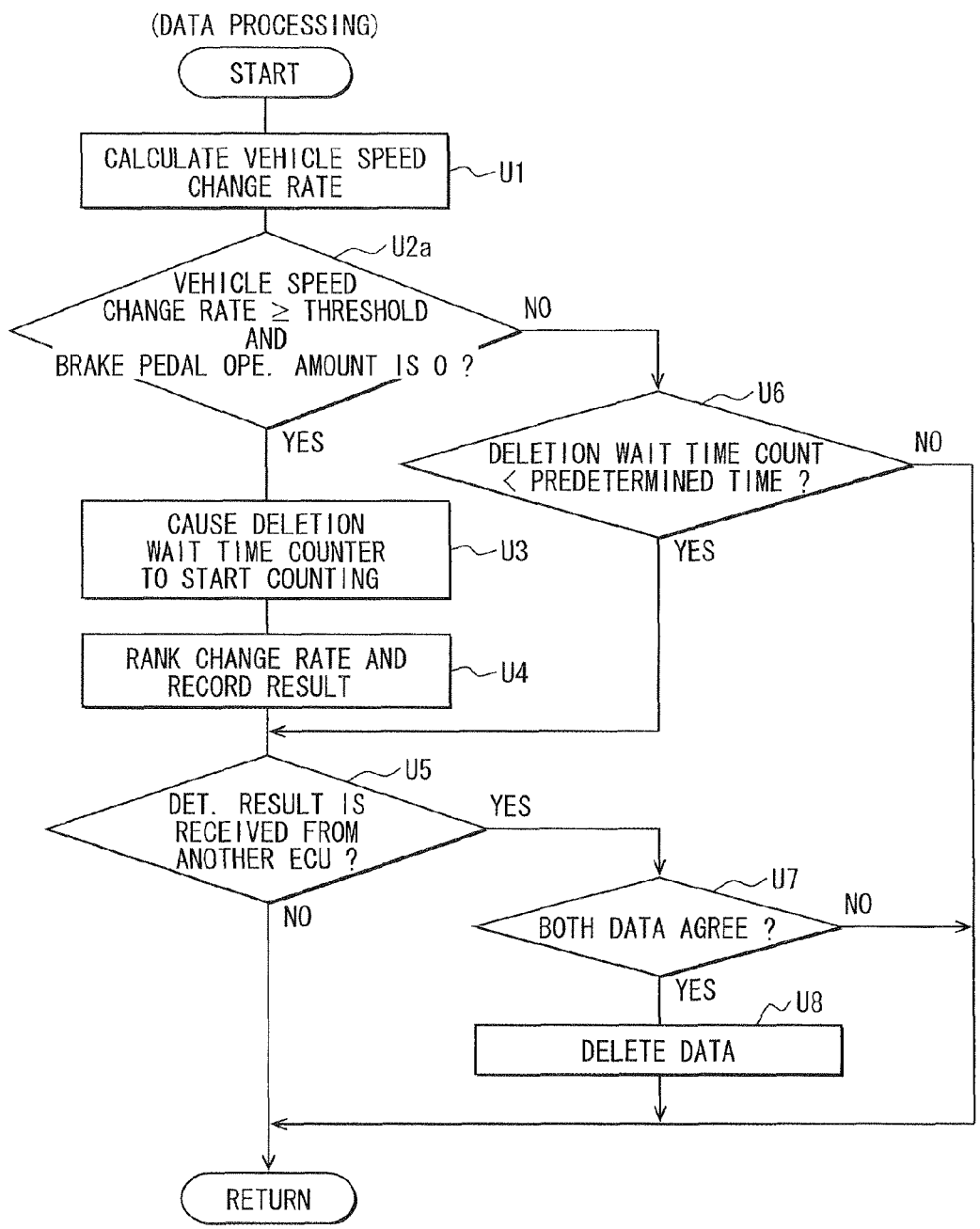
FIG. 10 is a flowchart of data processing.

In step S12 reached when the vehicle has not behaved as expected by the inter-vehicle distance control ECU 8, on the other hand, data processing similar to that being described later with reference to FIG. 10 is performed. In the processing performed in step S12, whether or not the unexpected behavior of the vehicle is attributed to control performed by another ECU is determined. When the unexpected behavior of the vehicle is determined not to be attributed to control performed by another ECU, the vehicle information and control information is stored in a nonvolatile RAM, not shown, and processing advances to step S13. In step S13, the elapsed time count t is incremented by 1, then processing returns to step S3a.

As described above, the inter-vehicle distance control ECU 8 determines whether or not an unexpected behavior has occurred during the inter-vehicle distance control performed by the inter-vehicle distance control ECU 8. When it is determined that the vehicle behavior has been as expected by the inter-vehicle distance control ECU 8, the inter-vehicle distance control ECU 8 ranks the actual change rate RR(t) that has resulted from the vehicle behavior and transmits the result of ranking as a determination result to the CAN 2. Namely, the inter-vehicle distance control ECU 8 outputs the determination result to inform another ECU that the behavior change represented by the speed change (the actual change rate) is attributed to the control performed by the inter-vehicle distance control ECU 8.

The airbag ECU 3 performs storage control shown in FIG. 3. In the processing of step T3, the processing shown in FIG. 10 different from the processing shown in FIG. 4 is performed. The processing of FIG. 10 may be performed after completion of the processing of FIG. 4 and vice versa.

First, in the subroutine shown in FIG. 10, a rate of change in the vehicle speed from Δt ago is calculated based on the sensor information received from the vehicle speed sensor 7 (step U1). Next, whether or not the calculated change rate meets the conditions for determining an unexpected behavior, i.e. whether or not the brake pedal depression depth is 0 and the change rate is equal to or larger than a predetermined value (e.g., a speed increase of 5 km/h) is determined in step U2a by the behavior determination section 31.

When the change rate is determined to indicate an unexpected behavior, the deletion wait time counter starts counting (step U3). In step U4, the storage control section 32 ranks the vehicle speed change rate (the vehicle information) and stores a result of ranking in the nonvolatile memory 34. In this case, the vehicle speed change rate may be ranked in −1, −2; or −3. Rank −1 is for a speed decrease of 5 km/h or more but below 10 km/h; rank −2 is for a speed decrease of 10 km/h or more but below 15 km/h; and rank −3 is for a speed decrease of 15 km/h or more. For step U4 which is performed only when the vehicle speed has decreased, only the vehicle speed change rate ranks for speed decreases are taken into consideration.

The nonvolatile memory 34 includes a storage area, for example, for three data of the vehicle information. When storing an additional data after the storage area for the three data is filled, the oldest one of the stored three data is overwritten.

Whether a determination result has been received from another ECU via the CAN 2 is determined (step U5). When such a determination result has been received, whether the received determination result (the rank determined in the foregoing step S10) agrees with the stored data (the rank determined in the foregoing step U4) is determined (step U7). When they agree, the vehicle information stored as described above is deleted (step U8). Steps U7 and U8 are performed by the correction section 33.

When it is determined in step U5 that no determination result has been received from any other ECU (i.e. determination result in step U5 is NO), the subroutine shown in FIG. 10 is exited and processing returns to the main routine shown in FIG. 3. Namely, the stored vehicle information is not deleted and is left readable. After processing returns to the main routine, step T2 is performed, then processing advances to step U1 of the subroutine. When the result of step U2 following step U1 is NO, namely, when the vehicle behavior is not determined unexpected, whether or not the count of the deletion wait time counter has reached a predetermined time length of for example 5 seconds is determined in step U6. When the count is 5 seconds or larger, processing immediately returns to the main routine. When the count is smaller than 5 seconds (result of step U6 is YES), processing advances to step U5.

As described above, the condition for determining an unexpected behavior is not limited to the accelerator opening being 0 as in the first and second embodiments. The condition may be based, for example, on the brake pedal depression depth. Also, the unexpected behavior need not necessarily relates to only one behavior, for example, acceleration. There may be plural unexpected behaviors, which relate to, for example, acceleration and deceleration, respectively.

<Fifth Embodiment>

Figure 11:
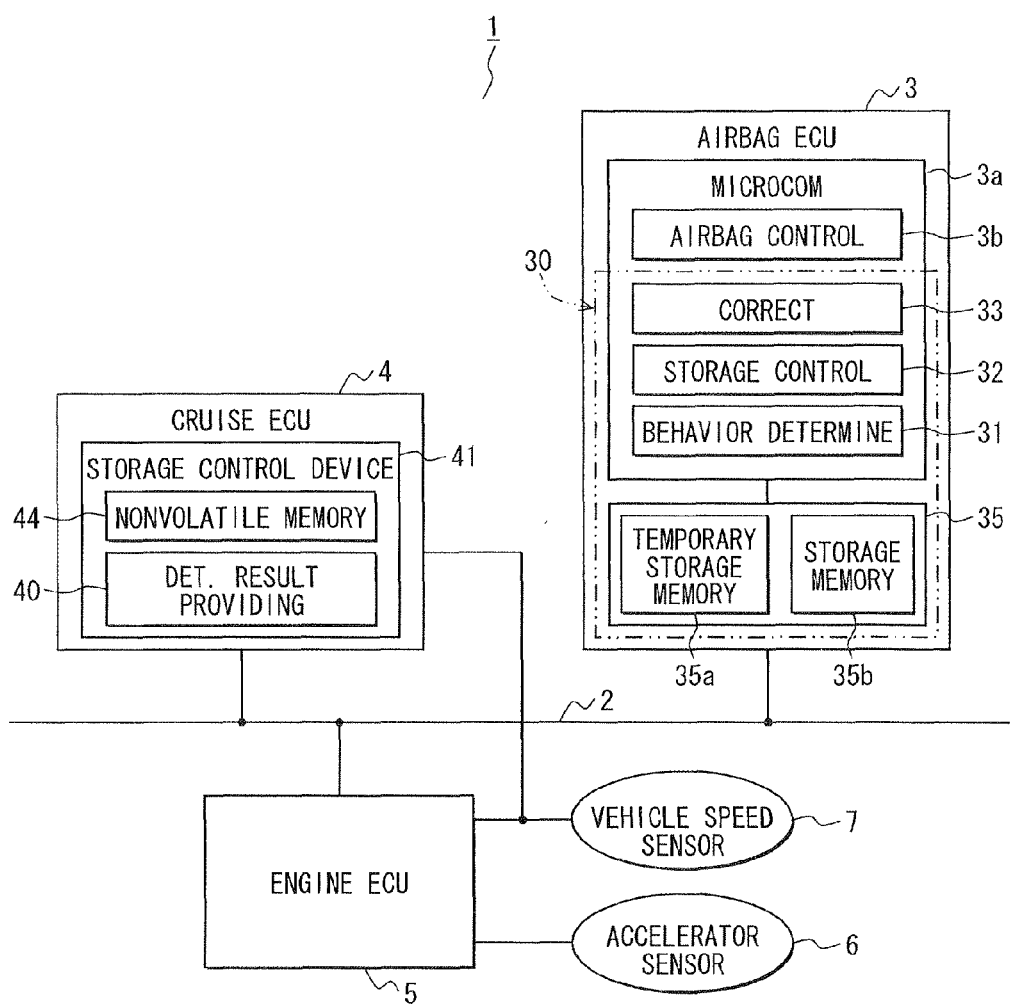
FIG. 11 is a functional block diagram of a vehicle behavior data storage control system according to a fifth embodiment.

FIGS. 11 and 12 show a fifth embodiment. In the fifth embodiment, unlike in the first embodiment, a memory 35 includes a temporary storage memory 35a as a first memory and a storage memory 35b as a second memory. The temporary storage memory 35a is formed of a volatile memory, for example, an SRAM, which is a volatile memory with relatively small degradation. The storage memory 35b is formed of a nonvolatile memory, for example, a flash memory which can retain data stored therein even when the power is turned off. A different memory configuration may also be used, for example, in which a predetermined area of a nonvolatile memory is used as a first memory and another predetermined area of the nonvolatile memory is used as a second memory.

FIG. 12 shows a subroutine of storage control performed by the airbag ECU 3. The subroutine is executed by being called from the main routine that is previously described with reference to FIG. 3. The control processing shown in FIG. 12 corresponds to that shown in FIG. 4 for the first embodiment.

In step V1, in a manner similar to that in step U1 of FIG. 4, a vehicle speed change rate is calculated. In step V2 following step V1, in a manner similar to that in step U2 of FIG. 4, whether or not the calculated change rate meets the conditions for determining occurrence of an unexpected behavior is determined. For example, whether or not the accelerator opening is 0 and the change rate satisfies a predetermined value of for example a speed increase of 5 km/h or more is determined. When it is determined that the change rate meets the conditions for determining occurrence of an unexpected behavior, processing advances to step V3; otherwise, processing advances to step V6.

In step V3, in a manner similar to that in step U3 of FIG. 4, when the change rate is determined to indicate an unexpected behavior, the deletion wait time counter starts counting. In step V4 following step V3, the vehicle speed change rate (vehicle information) is ranked and a result of ranking is stored in the temporary storage memory 35a. In this case, if present, past vehicle information is overwritten. In step V5 following step V4, a temporary storage flag provided in the temporary storage memory 35a is turned on. In step V8 following step V5, whether to branch processing is determined according to whether or not a determination result has been received from another ECU, for example, the cruise ECU 4. When it is determined that a determination result has been received from another ECU, processing advances to step V9; otherwise, the subroutine is terminated.

when it is determined in step V2 that the change rate does not meet the conditions for determining occurrence of an unexpected behavior, processing advances to step V6. In step V6, it is determined whether or not the temporary storage flag is on. When it is determined that the temporary storage flag is on, processing advances to step V7; otherwise (flag is off), the subroutine is terminated.

In step V7, it is determined whether or not the count of the deletion wait time counter has reached a predetermined time. When it is determined that the count of the deletion wait time counter has not reached the predetermined time, processing advances to step V8; otherwise (the predetermined time has been reached or exceeded), processing advances to step V11.

In step V11, the vehicle information (for example, the result of ranking the vehicle speed change rate) stored in the temporary storage memory 35b is copied or transferred to the storage memory 35b. This is done because until the deletion wait time counter reaches or exceeds the predetermined time, the storage control device fails to receive any determination result indicating that the vehicle information stored in the temporary storage memory 35b in correspondence to an unexpected behavior is attributed to the normal control processing performed by another ECU. Furthermore, the temporary storage flag is turned off, so that step V11 is not performed until a next determination of the occurrence of an unexpected behavior.

After step V5 or When it is determined in step V7 that the count of the deletion wait time counter has not reached the predetermined time (step V7=YES), processing advances to step V8. In step V8, it is determined whether or not a determination result has been received from another ECU. When it is determined that a determination result has been received from another ECU, processing advances to step V9; otherwise, the subroutine is terminated.

In step V9, it is determined whether or not the received determination result and the vehicle information stored in the temporary storage memory 35a in correspondence to the unexpected behavior agree with each other. When it is determined that the received determination result and the vehicle information agree with each other, processing advances to step V10; otherwise, the subroutine is terminated.

In step V10, because it has been determined in step V9 that the vehicle information determined to indicate an unexpected behavior is attributed to the control processing performed by another ECU, the temporary storage flag is turned off to prevent step V11 from being performed until next time occurrence of an unexpected behavior is determined in step V2.

According to the fifth embodiment, only the vehicle information corresponding to an unexpected behavior is stored in the storage memory 35b. The storage area of the storage memory 35b can, therefore, be fully used for the vehicle information that corresponds to an unexpected behavior and that can be made use of for analysis. This makes the fifth embodiment suitable for application when the capacity of the storage memory 35b is small. Specifically, taking the memory cost into account and considering that there is much data to be stored, the storage capacity of the storage memory 35b may be limited and an amount of data storable in the storage memory 35b may be also limited. In this case, if even only one data of the vehicle information not corresponding to the unexpected behavior is stored in the storage memory 35b incapable of storing a large amount of data, the available data area for storing the vehicle information in correspondence to an unexpected behavior for later analysis further decreases. This results in a decrease of data utilization efficiency. In this regard, in the fifth embodiment, the vehicle information is stored in the storage memory 35b after the vehicle information is confirmed to correspond to an unexpected behavior. In this way, even in cases where the storage capacity of the storage memory 35b is small and the number of pieces of data that can be stored in the storage memory 35b is small, the vehicle information corresponding to an unexpected behavior can be fully stored to improve data storage efficiency.

When the latest data that is stored in the storage memory 35b by being copied from the temporary storage memory 35a is deleted inadvertently or for whatever reason, the data can be restored from the temporary storage memory 35a.

When the vehicle information is stored in the storage memory 35b, the temporary storage flag is checked. The process for storing vehicle information in the storage memory 35b can be arranged such that vehicle information is copied from the temporary storage memory 35a to the storage memory 35b only once when a predetermined period of time has elapsed from detection of an unexpected behavior. In this way, the vehicle information that remains unchanged in the temporary storage memory 35a can be prevented from being repeatedly copied to the storage memory 35b within or after a predetermined period of time. Because of this, a memory such as flash ROM and EEPROM, for which the writing speed and the number of times of writing are limited, can used as the storage memory 35b. Moreover, even in cases where, because of use of both the predetermined period of time and the temporary storage flag, the period of storage control processing is lengthened due to, for example, frequent occurrence of interrupt processing, it is possible to copy, after elapsing of the predetermined period of time, the vehicle information to the storage memory 35b provided that no determination result has been received.

It may be sufficient for the temporary storage memory 35a, which temporarily stores the vehicle information, to have a storage capacity of one data of the vehicle information.

<Other Embodiments>

Embodiments are not limited to the foregoing embodiments. For example, the following modification is possible. The determination result transmitted from the cruise ECU 4 to the CAN 2 in the first embodiment may be transmitted (addressed) only to the storage control device 30 (i.e., the storage control device 30 is designated a destination. According to this configuration, another ECU connected to the CAN 2 can avoid receiving a irrelevant determination result.

Alternatively, each of multiple ECUs connected to an in-vehicle network may be equipped with both the storage control device and the determination result providing section. In addition, the storage control device of each ECU may determine whether a determination of occurrence of an unexpected behavior made by the each ECU agrees with a determination result received from the determination result providing section of another ECU. According to this configuration, the multiple ECUs can exchange determination results with each other, and can determine whether the unexpected behavior determined by each ECU is actually an unexpected behavior from the viewpoint of the whole vehicle (i.e. all ECUs).

In the embodiments, an example of unexpected behavior in the foregoing is the acceleration of the vehicle in a state where the driver does not press down the accelerator pedal, i.e. the accelerator pedal is not operated completely. However, a different vehicle condition may be regarded as an unexpected behavior. For example, when the engine rotation speed rises in a state where the driver is maintaining the accelerator pedal at a certain position to maintain the engine rotation as a steady state of a constant speed, the rising of the engine rotation speed may be regarded as an unexpected behavior. In this case, the airbag ECU 3 determines the rising of the engine rotation speed as an unexpected behavior and temporarily stores the corresponding vehicle information in the nonvolatile memory 34. However, when it is subsequently determined that the rising of the engine rotation speed results from driver's operation of the air-conditioner panel to cause an air-conditioner ECU, not shown, to activate a compressor, the air-conditioner ECU transmits to the CAN a determination result indicating that the rising of the engine rotation speed has been caused by the control processing performed by the air-conditioner ECU. Then, based on the determination result received from the air-conditioner ECU, the airbag ECU 3 deletes the vehicle information stored in the nonvolatile memory 34 or changes the stored vehicle information into an overwritable state. The unexpected behavior is not limited to the vehicle acceleration or the rising of the engine rotation speed in a state of no operation on the acceleration pedal. In addition, the ECU for outputting a determination result is not limited to the cruise ECU 4 or air-conditioner ECU.

The "vehicle information," "control information," and "control command" mentioned in the above description correspond to "behavior data" mentioned in the attached claims.

Also, the "determination result" corresponds to the "correction command" mentioned in claim 13, and the storage control device 30 included in the airbag ECU 3 corresponds to the "data storage device."

Embodiments have various aspects. For example, according to a first aspect, a vehicle behavior data storage control system is provided with the following configuration. The vehicle behavior data storage control system comprises a storage control device and an electronic control unit (ECU). The storage control device includes a behavior determination section that acquires behavior data and makes a first determination of whether or not an unexpected behavior has occurred based on the acquired behavior data. The storage control device further includes a memory for storing therein the behavior data associated with the unexpected behavior. The electronic control unit (ECU) controls a predetermined control target and is connected to the storage control device via an in-vehicle network to enable data exchange with the storage control device. The ECU includes a determination result providing section. In response to a change in the behavior data of the ECU, the determination result providing section makes a second determination of whether or not the change in the behavior data of the ECU is attributed to control performed by the ECU. In response to determining that the change in the behavior data is attributed to the control performed by the ECU, the determination result providing section transmits a result of the second determination to the in-vehicle network. The storage control device further includes a storage control section and a correction section. At a time when the behavior determination section makes the first determination that the unexpected behavior has occurred, the storage control section records the behavior data at the time of making the first determination in the memory. The correction section makes a third determination of whether or not content of the unexpected behavior relates to the result of the second determination transmitted from the ECU to the in-vehicle network. When making the third determination that the content of the unexpected behavior relates to the result of the second determination, the correction section deletes or permits overwriting the behavior data stored in the memory.

According to the above configuration, when the behavior determination section of the storage control device determines that an unexpected behavior has occurred, the behavior data is once stored in the memory. When the correction section subsequently determines that the unexpected behavior relates to the result of the second determination provided from the ECU, it is possible to delete the behavior data which was once stored in the memory, or it is possible to permits overwriting the stored behavior data. In this case, "permit overwriting" means that the data is prohibited from being read and is permitted to be overwritten. Therefore, only the behavior data appropriate for analysis remains stored in the memory in a readable state (an available state). It becomes possible to adequately analyze the unexpected behavior.

Furthermore, in response to a change in the inputted behavior data, the determination result providing section of the ECU determines whether or not the change is attributed to control performed by the ECU. When it is determined that the change is attributed to the control performed by the ECU, the ECU transmits this determination result to the in-vehicle network. Namely, the ECU transmits a determination result in response to the change in the behavior data relating only to the ECU. In this way, it is possible to prevent the in-vehicle network from getting crowded with communications, so that communications between the ECU and another ECU as well as between various behavior sensors and each ECU can be facilitated.

The above vehicle behavior data storage control system may be configured as follows. The storage control device and the ECU have common time information. The storage control device attaches the time information to the behavior data corresponding to the unexpected behavior. The ECU attaches the time information to the result of the second determination transmitted to the in-vehicle network. When (i) the stored behavior data relates to the result of the second determination and (ii) the time information attached to the result of the second determination and the time information attached to the behavior data agree with each other, the correction section deletes or permits overwriting the behavior data which corresponds to the unexpected behavior and which is stored in the memory.

According to the above configuration, it is determined whether the time information attached to the result of the second determination and the time information attached to the behavior data agree with each other, in addition to whether the behavior data, which corresponds to the unexpected behavior and is stored by the storage control device, relates to the result of the second determination. Therefore, it is possible to highly accurately determine whether or not the unexpected behavior detected with the storage control device is a truly-unexpected behavior.

The above vehicle behavior data storage control system may be configured as follows. The result of the second determination transmitted from the ECU to the in-vehicle network is addressed only to the storage control device. According to this configuration, an irrelevant ECU on the in-vehicle network is prevented from acquiring and processing the result of the second determination, which is irrelevant to the irrelevant ECU.

The above vehicle behavior data storage control system may be configured as follows. The above-recited ECU is a first ECU, and the vehicle behavior data storage control system further comprises a second ECU. That is, the above vehicle behavior data storage control system includes multiple ECUs. The first ECU, which includes the determination result providing section, controls an actuator based on a behavior sensor data inputted from a behavior sensor. The second ECU is configured not to receive the behavior sensor data from the behavior sensor. The second ECU is further configured to perform data reception only from the first ECU via the in-vehicle network and issue a request to the first ECU. According to this configuration, since the first ECU, which directly controls the actuator, transmits the determination result (the result of the second determination), it is possible to improve determination result providing accuracy.

The above vehicle behavior data storage control system may be configured as follows. The storage control device is equipped in another electronic control unit that is other and is different in type from the above ECU. According to this configuration, the another ECU can act as the behavior determination section, the storage control section and the correction section of the storage control device.

The above vehicle behavior data storage control system may be configured as follows. The memory includes a first memory and a second memory. When it is determined that the unexpected behavior has occurred, the storage control section records the behavior data in the first memory. In addition, the storage control section writes the behavior data in the second memory if the storage control section fails to receive the result of the second determination within a predetermined time after occurrence of the unexpected behavior. When the storage control section receives the result of the second determination within the predetermined time after the occurrence of the unexpected behavior, the correction section deletes or permits overwriting the behavior data stored in at least the first memory.

According to the above configuration, at least the second memory can store therein the behavior data that is determined to not be attributed to the control performed by another ECU.

According to a second aspect of embodiment, a subject electronic control unit is provided with the following configuration. The subject electronic control unit (i) acquires an actual behavior data indicating an actual vehicle behavior, (ii) determines, based on the acquired actual behavior data, whether or not an unexpected behavior has occurred, and (iii) is connected to a network when it is determined that unexpected behavior has occurred. A storage device for storing the actual behavior data is connected to the network. The subject electronic control unit comprises a controller that performs an estimation operation to provide an estimated behavior data based on an amount of control performed by the subject electronic control unit. When a difference between the estimated behavior data and the actual behavior data is less than or equal to a predetermined value, the controller outputs first information to the network. The first information indicates that the actual behavior data is attributed to the control performed by the subject electronic control unit.

According to the above configuration, when a behavior change occurs because the subject electronic control unit performs the control processing based on instructions from a vehicle driver, the subject electronic control unit can notify this to other devices connected with the network.

The above subject electronic control unit may further comprise a memory in which the subject electronic control unit records the actual behavior data. When the difference between the estimated behavior data and the actual behavior data is larger than the predetermined value, the controller records the actual behavior data in the memory.

According to the above configuration, the subject electronic control unit can also store the actual behavior data when a certain behavior occurs. The certain behavior is a behavior other than that is attributed to the control processing that the subject electronic control unit has performed based on the instructions from the vehicle driver.

The above subject electronic control unit may be configured as follows. When the subject electronic control unit receives second information, which is information indicating that the actual behavior data is attributed to control performed by another electronic control unit, via the network in a state where the actual behavior data is stored in the memory, the controller deletes the stored actual behavior data or changes the stored actual behavior data into an overwritable state.

According to the above configuration, when the another electronic control unit performs control processing based on instructions from the driver, a resultant behavior data is prevented from being uselessly stored in the subject electronic control unit.

The above subject electronic control unit may be configured as follows. In outputting the first information to the network, the controller attaches time information corresponding to the actual behavior data to the first information, which indicates that the actual behavior data is attributed to the control performed by the subject electronic control unit.

According to the above configuration, it is possible to highly accurately determine whether or not the unexpected behavior detected with a storage control device is a truly-unexpected behavior.

The above subject electronic control unit may be configured as follows. The memory includes a first memory and a second memory. When determining that the difference between the estimated behavior data and the actual behavior data is larger than the predetermined value, the controller records the actual behavior data in the first memory. In addition, the controller writes the actual behavior data in the second memory if the controller fails to receive second information within a predetermined time after occurrence of the difference. The second information indicates that the actual behavior data is attributed to control performed by another electronic control unit. When the controller receives the second information within the predetermined time after the occurrence of the difference, the controller deletes or permits overwriting at least the actual behavior data stored in the first memory.

According to the above configuration, the subject electronic control unit includes the second memory. The actual behavior data not attributed to control of an electronic control unit other than the subject electronic control unit can be stored in the second memory.

According to a third aspect of the present disclosure, a data storage device connected to a network for a vehicle can be provided with the following configuration. The network is connected with an electronic control unit. The electronic control unit outputs a control command for controlling an actuator. When an actual behavior data representing an actual vehicle behavior is attributed to the control command of the electronic control unit, the electronic control unit outputs a correction command. The data storage device comprises a memory and a controller. When determining based on the actual behavior data that an unexpected behavior has occurred, the controller records the actual behavior data in the memory. When receiving the correction command, the controller deletes the actual behavior data stored in the memory or changes the actual behavior data stored in the memory into an overwritable state.

According to the above configuration, when a behavior change occurs due to control processing that the electronic control unit has performed based on instructions from a vehicle driver, the storage device receives the control command. Thereby, a resultant behavior data, which is attributed to control processing that the electronic control unit has performed based on the instructions from the driver, is prevented from being uselessly stored in the memory of the data storage device.

The above data storage device may be configured as follows. The memory includes a first memory and a second memory. When determining that the unexpected behavior has occurred, the controller records the actual behavior data in the first memory. In addition, the controller writes the actual behavior data in the second memory if the controller fails to receive the correction command within a predetermined time after occurrence of the unexpected behavior. When the controller receives the correction command within the predetermined time after the occurrence of the unexpected behavior, the controller deletes or permits overwriting at least the actual behavior data stored in the first memory.

According to the above configuration, the actual behavior data that is not attributed to control of the electronic control unit connected with the network can be stored in the second memory.

While the invention has been described above with reference to various embodiments thereof, it is to be understood that the invention is not limited to the above described embodiments and constructions. The invention is intended to cover various modifications and equivalent arrangements.

What is claimed is:

1. A vehicle behavior data storage control system, comprising:
    a storage control device that includes
        a behavior determination section that acquires behavior data and makes a first determination of whether or not an unexpected behavior has occurred based on the acquired behavior data, and
        a memory for storing therein the behavior data associated with the unexpected behavior; and
    an electronic control unit (ECU) that controls a predetermined control target and is connected to the storage control device via an in-vehicle network to enable data exchange with the storage control device,
    wherein:
        the ECU includes a determination result providing section;
        in response to a change in the behavior data of the ECU, the determination result providing section makes a second determination of whether or not the change in the behavior data of the ECU is attributed to control performed by the ECU;
        in response to determining that the change in the behavior data is attributed to the control performed by the ECU, the determination result providing section transmits a result of the second determination to the in-vehicle network;
        the storage control device further includes a storage control section and a correction section;
        at a time when the behavior determination section makes the first determination that the unexpected behavior has occurred, the storage control section records the behavior data at the time of making the first determination in the memory;
        the correction section makes a third determination of whether or not a content of the unexpected behavior relates to the result of the second determination transmitted from the ECU to the in-vehicle network; and
        when making the third determination that the content of the unexpected behavior relates to the result of the second determination, the correction section deletes or permits overwriting the behavior data stored in the memory.

2. The vehicle behavior data storage control system according to claim 1, wherein:
    the storage control device and the ECU have common time information;
    the storage control device attaches the time information to the behavior data corresponding to the unexpected behavior;
    the ECU attaches the time information to the result of the second determination transmitted to the in-vehicle network; and
    when (i) the stored behavior data relates to the result of the second determination and (ii) the time information attached to the result of the second determination and the time information attached to the behavior data agree with each other, the correction section deletes or permits overwriting the behavior data which corresponds to the unexpected behavior and which is stored in the memory.

3. The vehicle behavior data storage control system according to claim 1, wherein:
    the result of the second determination transmitted from the ECU to the in-vehicle network is addressed only to the storage control device.

4. The vehicle behavior data storage control system according to claim 1, wherein the ECU recited in claim 1 is a first ECU, the vehicle behavior data storage control system further comprising:
    a second ECU,
    wherein:
        the first ECU, which includes the determination result providing section, controls an actuator based on a behavior sensor data inputted from a behavior sensor;
        the second ECU is configured not to receive the behavior sensor data from the behavior sensor; and
        the second ECU is further configured to perform data reception only from the first ECU via the in-vehicle network and issue a request to the first ECU.

5. The vehicle behavior data storage control system according to claim 1, wherein:
    the storage control device is equipped in an electronic control unit that is other the ECU recited in claim 1 and that is different in type from the ECU recited in claim 1.

6. The vehicle behavior data storage control system according to claim 1, wherein:
    the memory includes a first memory and a second memory;
    when it is determined that the unexpected behavior has occurred, the storage control section
        records the behavior data in the first memory, and
        writes the behavior data in the second memory when the storage control section fails to receive the result of the second determination within a predetermined time after occurrence of the unexpected behavior; and
    when the storage control section receives the result of the second determination within the predetermined time after the occurrence of the unexpected behavior, the correction section deletes or permits overwriting the behavior data stored in at least the first memory.

7. A subject electronic control unit that (i) acquires an actual behavior data indicating an actual vehicle behavior, (ii) determines, based on the acquired actual behavior data, whether or not an unexpected behavior has occurred, and (iii) is connected to a network when it is determined that unexpected behavior has occurred, wherein a storage device for storing the actual behavior data is connected to the network, the subject electronic control unit comprising:
    a controller that performs an estimation operation to provide an estimated behavior data based on an amount of control performed by the subject electronic control unit,
    wherein:
        when a difference between the estimated behavior data and the actual behavior data is less than or equal to a predetermined value, the controller outputs first information to the network; and
        the first information indicates that the actual behavior data is attributed to the control performed by the subject electronic control unit.

8. The subject electronic control unit according to claim 7, further comprising
a memory in which the subject electronic control unit records the actual behavior data; wherein:
when the difference between the estimated behavior data and the actual behavior data is larger than the predetermined value, the controller records the actual behavior data in the memory.

9. The subject electronic control unit according to claim 8, wherein:
when the subject electronic control unit receives second information, which is information indicating that the actual behavior data is attributed to control performed by another electronic control unit, via the network in a state where the actual behavior data is stored in the memory, the controller deletes the stored actual behavior data or changes the stored actual behavior data into an overwritable state.

10. The subject electronic control unit according to claim 7, wherein:
in outputting the first information to the network, the controller attaches a time information corresponding to the actual behavior data to the first information, which indicates that the actual behavior data is attributed to the control performed by the subject electronic control unit.

11. The electronic control unit according to claim 8, wherein:
the memory includes a first memory and a second memory;
when determining that the difference between the estimated behavior data and the actual behavior data is larger than the predetermined value, the controller records the actual behavior data in the first memory, and
writes the actual behavior data in the second memory when the controller fails to receive second information within a predetermined time after occurrence of the difference;
the second information indicates that the actual behavior data is attributed to control performed by another electronic control unit; and
when the controller receives the second information within the predetermined time after the occurrence of the difference, the controller deletes or permits overwriting at least the actual behavior data stored in the first memory.

12. A data storage device connected to a network for a vehicle, wherein the network is connected with an electronic control unit, wherein the electronic control unit outputs a control command for controlling an actuator, wherein when an actual behavior data representing an actual vehicle behavior is attributed to the control command of the electronic control unit, the electronic control unit outputs a correction command, the data storage device comprising:
a memory; and
a controller,
wherein:
when determining, based on the actual behavior data, that an unexpected behavior has occurred, the controller records the actual behavior data in the memory; and
when receiving the correction command, the controller deletes the actual behavior data stored in the memory or changes the actual behavior data stored in the memory into an overwritable state.

13. The data storage device according to claim 12, wherein:
the memory includes a first memory and a second memory;
when determining that the unexpected behavior has occurred, the controller records the actual behavior data in the first memory, and
writes the actual behavior data in the second memory when the controller fails to receive the correction command within a predetermined time after occurrence of the unexpected behavior; and
when the controller receives the correction command within the predetermined time after the occurrence of the unexpected behavior, the controller deletes or permits overwriting at least the actual behavior data stored in the first memory.

14. A vehicle behavior data storage control system, comprising:
a storage control device that includes
a behavior determination section that acquires behavior data and makes a first determination of whether or not an unexpected behavior has occurred based on the acquired behavior data, and
a memory for storing therein the behavior data associated with the unexpected behavior; and
an electronic control unit (ECU) that controls a predetermined control target and is connected to the storage control device via an in-vehicle network to enable data exchange with the storage control device,
wherein:
the ECU includes a determination result providing section;
in response to a change in the behavior data of the ECU, the determination result providing section makes a second determination of whether or not the change in the behavior data of the ECU is attributed to control performed by the ECU;
in response to determining that the change in the behavior data is attributed to the control performed by the ECU, the determination result providing section transmits a result of the second determination to the in-vehicle network;
the storage control device further includes a storage control section; and
at a time when the behavior determination section makes the first determination that the unexpected behavior has occurred, the storage control section records the behavior data at the time of making the first determination in the memory.

* * * * *